(12) United States Patent
Jeong et al.

(10) Patent No.: US 8,718,018 B2
(45) Date of Patent: *May 6, 2014

(54) METHOD AND APPARATUS FOR REPORTING INTER-FREQUENCY MEASUREMENT USING RACH MESSAGE IN A MOBILE COMMUNICATION SYSTEM

(75) Inventors: Kyeong-In Jeong, Suwon-si (KR); Gert Jan Van Lieshout, Middlesex (GB); Himke Van Dervelde, Middlesex (GB); No-Jun Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,346

(22) Filed: Sep. 14, 2012

(65) Prior Publication Data

US 2013/0010630 A1 Jan. 10, 2013

Related U.S. Application Data

(63) Continuation of application No. 11/417,213, filed on May 4, 2006, now Pat. No. 8,270,365.

(30) Foreign Application Priority Data

May 4, 2005 (KR) ........................ 10-2005-0037773
May 9, 2005 (KR) ........................ 10-2005-0038640
Nov. 2, 2005 (KR) ........................ 10-2005-0104634

(51) Int. Cl.
*H04W 4/00* (2009.01)
*H04W 28/04* (2009.01)
*H04W 24/10* (2009.01)
*H04W 48/16* (2009.01)
*H04L 5/00* (2006.01)
*H04L 1/18* (2006.01)
*H04B 17/00* (2006.01)

(52) U.S. Cl.
CPC .............. *H04W 28/04* (2013.01); *H04W 24/10* (2013.01); *H04W 48/16* (2013.01); *H04L 5/0098* (2013.01); *H04L 1/1854* (2013.01); *H04B 17/0057* (2013.01)
USPC ........... 370/331; 370/230; 370/232; 370/235; 370/236.2; 370/236.1; 370/278; 370/329; 455/437; 455/439; 455/444; 455/456.5; 455/9; 455/15; 455/22; 455/69; 455/42; 455/435.2; 455/517; 455/524; 455/525

(58) Field of Classification Search
USPC ........... 370/230, 232, 235, 236.2, 236.1, 278, 370/329, 331; 455/15, 22, 69, 42, 435.2, 455/437, 439, 444, 456.5, 9, 517, 525
See application file for complete search history.

(56) References Cited

U.S. PATENT DOCUMENTS

| 6,445,917 | B1 * | 9/2002 | Bark et al. ................... 455/423 |
|---|---|---|---|
| 6,845,238 | B1 | 1/2005 | Müller |
| 8,270,365 | B2 | 9/2012 | Jeong et al. |
| 2001/0036827 | A1 | 11/2001 | Edlund et al. |
| 2002/0071480 | A1 | 6/2002 | Marjelund et al. |
| 2002/0183061 | A1 | 12/2002 | Moore |
| 2003/0157952 | A1 | 8/2003 | Sarkkinen et al. |
| 2004/0137926 | A1 | 7/2004 | So |

FOREIGN PATENT DOCUMENTS

| EP | 1 377 102 A2 | 1/2004 |
|---|---|---|
| EP | 1 377 102 A3 | 3/2004 |
| KR | 10-2004-0036863 A | 5/2004 |
| WO | 0070897 A1 | 11/2000 |
| WO | 0122759 A1 | 3/2001 |
| WO | WO 01/76274 A2 | 10/2001 |
| WO | WO 03/071816 A1 | 8/2003 |

OTHER PUBLICATIONS

3GPP Organizational Partners, "3rd Generation Partnership Project; Technical Specification Group Radio Access Network; RRC Protocol Specification (Release 1999)", Jun. 2005, pp. 1-1153, 3GPP TS 25.331 V6.6.0 (Jun. 2005) 3GPP, Valbonne, France.

3GPP Organizational Partners, "3rd Generation Partnership Project; Technical Specification Group Radio Access Network; RRC Protocol Specification (Release 1999)", Mar. 2005, pp. 1-1145, 3GPP TS 25.331 V6.5.0 (Mar. 2005) 3GPP, Valbonne, France.

3GPP Organizational Partners, "3rd Generation Partnership Project; Technical Specification Group Radio Access Network; Radio Resource Control (RRC); Protocol Specification (Release 1999)", Jun. 2002, pp. 1-833, 3GPP TS 25.331 V3.11.0 (Jun. 2002) 3GPP, Valbonne, France.

3GPP Organizational Partners, "3rd Generation Partnership Project; Technical Specification Group Radio Access Network; RRC Protocol Specification (Release 1999)", Jun. 2000, pp. 1-556, 3G TS 25.331 V3.3.0 (Jun. 2000) 3GPP, Valbonne, France.

"Introduction of inter-frequency measurement reporting in RACH reporting", 3GPP TSG-RAN WG2 Meeting #46, Scottsdale, USA, Feb. 14-18, 2005, pp. 1-20.

"Introduction of inter-frequency measurement reporting in RACH reporting", 3GPP TSG-RAN WG2 Meeting #46bis, Beijing, China, Apr. 4-8, 2005, pp. 1-20.

"Introduction of inter-frequency measurement reporting in RACH reporting", 3GPP TSG-RAN WG2 Meeting #46bis, Beijing, China, Apr. 4-8, 2005, pp. 1-18.

"Introduction of inter-frequency RACH measurement reporting", 3GPP TSG-RAN WG2 Meeting #47, Athens, Greece, May 9-13, 2005, pp. 1-17.

"Introduction of inter-frequency RACH measurement reporting", 3GPP TSG-RAN WG2 Meeting #47, Athens, Greece, May 9-13, 2005, pp. 1-18.

\* cited by examiner

*Primary Examiner* — Nimesh Patel
(74) *Attorney, Agent, or Firm* — Roylance, Abrams, Berdo & Goodman, LLP

(57) ABSTRACT

A user equipment (UE) is provided which reduces uplink signaling overhead in the process of reporting inter-frequency measurement results over a RACH. For measurement reporting, the UE receives an SIB including a cell information list for non-used frequency cells and a threshold from an RNC, compares signal strengths of signals received from the non-used frequency cells with the threshold, and acquires at least one inter-frequency cell ID indicating at least one non-used frequency cell having signal strength exceeding the threshold from the cell information list. The at least one inter-frequency cell ID is included in a RACH message as measurement result information for the at least one non-used frequency cell, and transmitted to the RNC. The RNC determines that the cell corresponding to the inter-frequency cell ID has signal strength exceeding the threshold.

10 Claims, 14 Drawing Sheets

METHOD AND APPARATUS FOR REPORTING INTER-FREQUENCY MEASUREMENT USING RACH MESSAGE IN A MOBILE COMMUNICATION SYSTEM

CROSS-REFERENCE TO RELATED APPLICATIONS

This is a continuation application of U.S. application Ser. No. 11/417,213, filed May 4, 2006, now U.S. Pat. No. 8,270,365, entitled "Method and Apparatus for Reporting Inter-Frequency Measurement Using RACH Message in a Mobile Communication System", the entire contents of which are hereby incorporated by reference, which claims the benefit under 35 U.S.C. §119(a) of Korean Patent Application No. 10-2005-0037773 entitled "Method and Apparatus for Reporting Inter-Frequency Measurement Using RACH Message in a Mobile Communication System", filed in the Korean Intellectual Property Office on May 4, 2005, Korean Patent Application No. 10-2005-0038640 entitled "Method and Apparatus for Reporting Inter-Frequency Measurement Using RACH Message in a Mobile Communication System", filed in the Korean Intellectual Property Office on May 9, 2005, and Korean Patent Application No. 10-2005-0104634 entitled "Method and Apparatus for Reporting Inter-Frequency Measurement Using RACH Message in a Mobile Communication System", filed in the Korean Intellectual Property Office on Nov. 2, 2005, the entire disclosures of all of which are hereby incorporated by reference.

BACKGROUND OF THE INVENTION

1. Field of the Invention

The present invention relates generally to a mobile communication system employing Code Division Multiple Access (CDMA). In particular, the present invention relates to a method and apparatus in which a terminal (or user equipment (UE)) reports measurement results to the system.

2. Description of the Related Art

A Universal Mobile Telecommunication Service (UMTS) system, which is an asynchronous $3^{rd}$ generation (3G) mobile communication system employing Wideband Code Division Multiple Access (WCDMA) based on European Global System for Mobile Communications (GSM) and General Packet Radio Services (GPRS), provides consistent service that is capable of allowing telephone or computer users to transmit packet switched text, digitized voice, video, and multimedia data, at rates of about 2 Mbps all over the world. UMTS uses a virtual access technology, the so-called packet switched access based on a packet protocol such as Internet Protocol (IP), and can always access any other terminals in the network.

In the $3^{rd}$ Generation Project Partnership (3GPP), the standard for the asynchronous 3G mobile communication system, a Random Access Channel (RACH) which is an uplink common channel, is used for network access and control and transmission of short-length data. Such logical channels, for example a Dedicated Control Channel (DCCH), a Common Control Channel (CCCH), and a Dedicated Traffic Channel (DTCH), can be mapped to the RACH which is a transport channel.

The RACH can be used for measurement reporting. That is, a UE includes measurement results indicating its measured radio strengths of other cells and other frequencies in a Radio Resource Control (RRC) message for signaling, transmitted to a Radio Network Controller (RNC) over the RACH. The measurement results are used by the system to determine whether a communication environment of a UE is good, and whether the UE is located in a handover region. Measurement control system information needed for performing inter-frequency and intra-frequency measurements is included in system information blocks (SIB) received from the RNC. The UE, in an idle mode or a connected mode, receives a SIB transmitted over a broadcast channel and acquires the measurement control system information therefrom.

Table 1 and Table 2 below show, by way of example, a format of a RACH message for reporting inter-frequency measurement system information and inter-frequency measurement results, included in SIB11/12 to be used for reporting the inter-frequency measurement results. SIB11/12 includes measurement-related control information used in the current cell, wherein SIB11 is for an idle mode UE and SIB12 is for a connected mode UE. If there is no SIB12, the connected mode UE also refers to SIB11.

Table 1 consists of Table 1a to Table 1c. Table 1a shows a format of 'Inter-frequency measurement system information' included in SIB11/12. In Table 1a, an 'Inter-frequency reporting quantity for RACH reporting' information element (IE) and a 'maximum number of inter-frequency reported cells on RACH' IE are information for including inter-frequency measurement result values in the RACH message.

TABLE 1a

Inter-frequency measurement system information in SIB 11/12

| Information Element/Group name | Multi | Type and reference | Semantics description |
|---|---|---|---|
| Inter-frequency cell info list | | Inter-frequency cell info list | |
| Inter-frequency reporting quantity for RACH Reporting | | Inter-frequency reporting quantity for RACH Reporting | |
| Maximum number of inter-frequency Reported cells on RACH | | Maximum number of reported cells on RACH | |

TABLE 1b

Inter-frequency reporting quantity for RACH reporting

| Information Element/Group name | Multi | Type and reference | Semantics description |
|---|---|---|---|
| CHOICE mode | | | |
| >FDD | | | |
| >>Reporting quantity | | Enumerated(CPICH Ec/N0, CPICH RSCP, No report) | |
| >TDD | | | |
| >>Reporting quantity list | 1 to 2 | | |
| >>>Reporting quantity | | Enumerated(Timeslot ISCP, Primary CCPCH RSCP, No report) | |

TABLE 1c

Maximum number of inter-frequency reported cells on RACH

| Information Element/Group name | Multi | Type and reference | Semantics description |
|---|---|---|---|
| Maximum number of reported cells per for all reported non-used frequencies | | Integer(1 ... 8) | |

A 'Reporting quantity' IE as shown in Table 1b indicates which reporting quantity is to be used when the inter-frequency measurement system information is transmitted over the RACH. For example, in a cell using Frequency Division Duplex (FDD), a chip-to-noise energy Ec/No of a Common Pilot Channel (CPICH) or a Receive Signal Code Power (RSCP) of the CPICH is used as a measurement result, or 'No report' can be used to transmit no inter-frequency measurement result. A 'Maximum number' IE as shown in Table 1c indicates the maximum number of cells to which the inter-frequency measurement results will be transmitted over the RACH.

In transmitting the RACH message including the inter-frequency measurement results, if the 'Reporting quantity' IE and the 'Maximum number' IE are included in SIB11/12, the UE writes and includes as much inter-frequency measurement results as the 'Maximum number' IE in the RACH message according to the 'Reporting quantity' IE.

For example, if the 'Maximum number' IE is set to '2' and the 'Reporting quantity' IE indicates an Ec/No of the CPICH, the UE includes an inter-frequency cell info list for 2 non-used frequency band cells and CPICH Ec/No for the non-used frequency band cells in the RACH message according to the measurement results for the non-used frequency band cells whose frequencies are different from the currently used frequency. Table 2 below shows an information format of the inter-frequency measurement results included in the RACH message.

TABLE 2

Measured results on RACH

| Information Element/ group name | Multi | Type and reference | Semantics description |
|---|---|---|---|
| Measurement result for current cell | | | |
| Measurement results for monitored cells on non-used frequencies | 1 to <maxFreq> | | |
| >Frequency info | | Frequency info | |
| >Inter-frequency cell measurement results | | | |
| >>CHOICE mode | | | |
| >>>FDD | | | |
| >>>>Primary CPICH info | | Primary CPICH info | |
| >>>>CHOICE measurement quantity | | | One spare value is needed. |
| >>>>>CPICH Ec/N0 | | Integer(0 . . . 49) | In dB. According to CPICH_Ec/ No in [19]. Fourteen spare values are needed. |
| >>>>>CPICH RSCP | | Integer(0 . . . 91) | In dBm. According to CPICH_ RSCP_LEV in [19]. Thirty-six spare values are needed. |
| >>>TDD | | | |
| >>>>Cell parameters Id | | Cell parameters Id | |
| >>>>Primary CCPCH RSCP | | Primary CCPCH RSCP info | |

In this case, monitored cells consist of neighbouring cells.

| Condition | Explanation |
|---|---|
| DCCH | This IE is optionally present when DCCH is used and not needed otherwise. |

As shown in Table 2, in reporting the inter-frequency measurement results over the RACH message, the UE includes as much 'Frequency Info', 'Primary CPICH info' and 'measurement quantity' as the 'Maximum number' IE, transmitted through SIB11/12, in the RACH message, causing an excessive increase in the size of the RACH message.

In addition, the UE includes the measurement results for the non-used frequencies in the RACH message even though the channels states of the non-used frequencies are bad. As is known to those skilled in the art, in order to transmit a message over the RACH, the UE should first send a request for RACH transmission approval to a base station (or Node B) and receive response information indicating approval of the RACH transmission from the Node B. Therefore, when RACH transmission approval requests are issued by a plurality of UEs, each UE may fail to obtain RACH transmission approval within the 'Maximum number'. Nonetheless, if each UE unnecessarily transmits the measurement results on several non-used frequencies over the RACH, signaling overhead of the RACH may increase excessively.

That is, in conventional measurement reporting, the measurement result information included in the RACH message includes many IEs, and there is no criterion for reporting, by the UE, the measurement results over the RACH, causing an increase in an uplink load.

Accordingly, a need exists for a system and method for effectively and efficiently reporting measurement results.

SUMMARY OF THE INVENTION

An object of embodiments of the present invention is to substantially solve at least the above problems and/or disadvantages, and to provide at least the advantages below. Accordingly, embodiments of the present invention provide a method and apparatus in which a UE minimizes an information format of measurement reports transmitted over a RACH to thereby reduce signaling overhead of the RACH message.

According to one aspect of embodiments of the present invention, a method is provided for reporting an inter-frequency measurement result using a random access channel (RACH) message in a mobile communication system. The method comprises the steps of receiving a system information block (SIB) comprising an inter-frequency cell information list for non-used frequency cells and a threshold from the system for inter-frequency measurement reporting, measuring signal strengths of signals received from the non-used frequency cells and comparing the measured signal strengths with the threshold and if there is any signal strength exceeding the threshold, acquiring at least one inter-frequency cell identifier (ID) indicating at least one non-used frequency cell having the signal strength exceeding the threshold from the inter-frequency cell information list, and including the at least one inter-frequency cell ID in the RACH message as inter-frequency measurement result information and transmitting the RACH message to the system.

According to another aspect of embodiments of the present invention, a user equipment (UE) apparatus is provided for reporting an inter-frequency measurement result using a random access channel (RACH) message in a mobile communication system. The apparatus comprises a system information block (SIB) reception and analysis unit for receiving a SIB comprising an inter-frequency cell information list for non-used frequency cells and a threshold from the system for inter-frequency measurement reporting, a measurement unit for measuring signal strengths of signals received from the non-used frequency cells, a measurement report decision unit for comparing the measured signal strengths with the threshold and if there is at least one signal strength exceeding the threshold, determining to perform inter-frequency measurement reporting, and a measurement report unit for, if the measurement report decision unit determines to perform inter-frequency measurement reporting, acquiring at least one inter-frequency cell identifier (ID) indicating at least one non-used frequency cell having the signal strength exceeding the threshold from the inter-frequency cell information list, including the at least one inter-frequency cell ID in the RACH message as inter-frequency measurement result information, and transmitting the RACH message to the system.

According to another aspect of embodiments of the present invention, a method is provided for receiving inter-frequency measurement reporting using a random access channel (RACH) message in a mobile communication system. The method comprises the steps of transmitting a system information block (SIB) comprising an inter-frequency cell information list for non-used frequency cells and a threshold to each of controlled cells to control inter-frequency measurement reporting, receiving a RACH message from a user equipment (UE) located in one of the controlled cells, extracting at least one inter-frequency cell identifier (ID) corresponding to inter-frequency measurement result information from the RACH message, acquiring cell information corresponding to the extracted inter-frequency cell ID referring to the inter-frequency cell information list, and acquiring a measurement result indicating signal strength corresponding to the inter-frequency cell ID referring to at least one of the inter-frequency measurement result information and the threshold.

According to yet another aspect of embodiments of the present invention, a radio network controller (RNC) is provided for receiving inter-frequency measurement reporting using a random access channel (RACH) message in a mobile communication system. The RNC comprises a system information system (SIB) generation and transmission unit for transmitting an SIB comprising an inter-frequency cell information list for non-used frequency cells and a threshold to each of controlled cells to control inter-frequency measurement reporting, a RACH receiver for receiving a RACH message from a user equipment (UE) located in one of the controlled cells and extracting at least one inter-frequency cell identifier (ID) corresponding to inter-frequency measurement result information from the RACH message, a cell index mapping unit for acquiring cell information corresponding to the extracted inter-frequency cell ID referring to the inter-frequency cell information list, and a measurement result analyzer for acquiring a measurement result indicating signal strength corresponding to the inter-frequency cell ID referring to at least one of the inter-frequency measurement result information and the threshold.

According to still another aspect of the present invention, a method is provided for reporting an inter-frequency measurement result using a random access channel (RACH) message in a mobile communication system. The method comprises the steps of receiving, by a control radio network controller (CRNC) that controls a current cell where a user equipment (UE) is located, a RACH message comprising at least one inter-frequency cell identifier (ID) for at least one non-used frequency cell as inter-frequency measurement result information from the UE, acquiring at least one cell information corresponding to the at least one inter-frequency cell ID, and transmitting an uplink signaling transfer message comprising an inter-frequency cell information list having the acquired at least one cell information, and the RACH message, to a serving radio network controller (SRNC) that controls radio resources of the UE.

According to still another aspect of embodiments of the present invention, a method is provided for receiving inter-frequency measurement reporting using a random access channel (RACH) message in a mobile communication system. The method comprises the steps of receiving, by a serving radio network controller (SRNC) that controls radio resources of a user equipment (UE), an uplink signaling transfer message comprising a RACH message having at least one inter-frequency cell identifier (ID) for at least one non-used frequency cell, and at least one cell information corresponding to the at least one inter-frequency cell ID as inter-frequency measurement result information, from a control radio network controller (CRNC) that controls a current cell where the UE is located, and determining radio quality of the UE depending on the inter-frequency measurement result information and the at least one cell information.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Several exemplary embodiments of the present invention will now be described in detail with reference to the annexed drawings. In the following description, a detailed description of known functions and configurations incorporated herein has been omitted for clarity and conciseness.

Although exemplary embodiments of the present invention will be described with reference to a UMTS mobile communication system proposed in 3GPP, the standard for the asynchronous 3G mobile communication system, embodiments of the present invention can also be applied to all kinds of mobile communication systems employing the measurement report.

Figure 1:
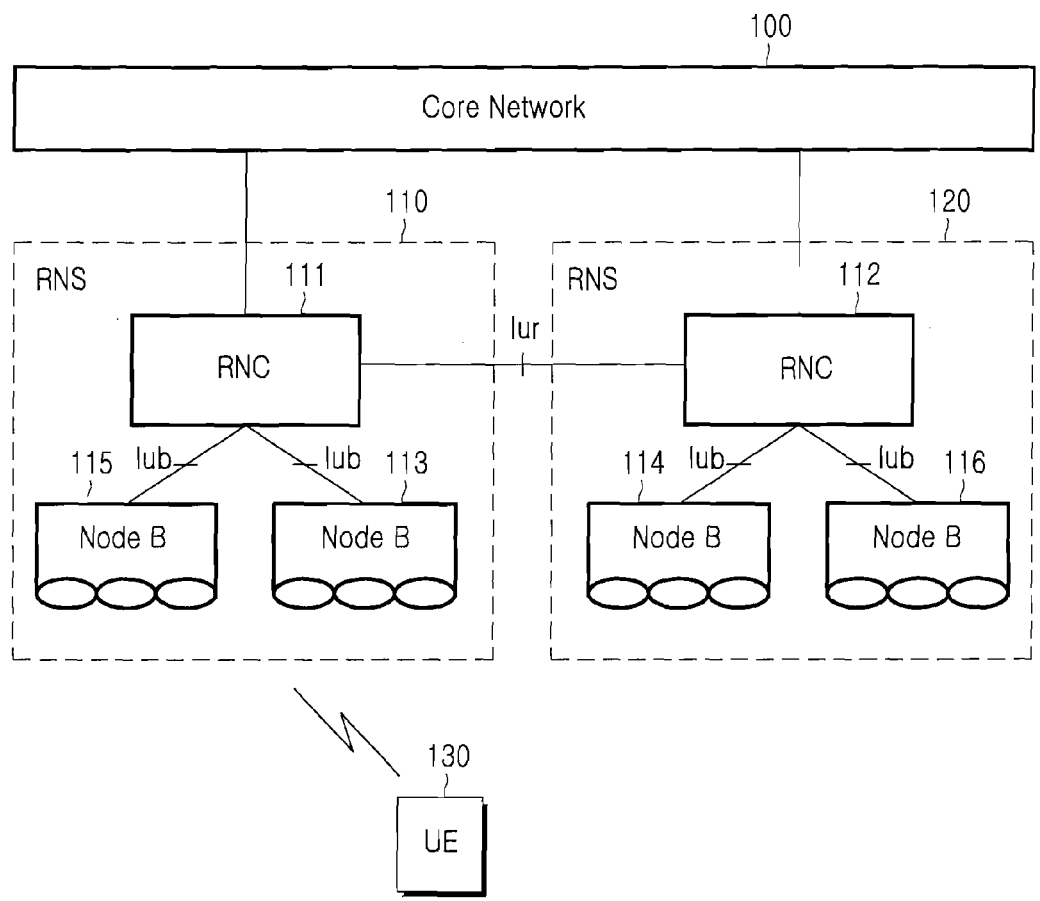
FIG. 1 is a diagram schematically illustrating exemplary architecture of a general UMTS mobile communication system.

FIG. 1 is a diagram schematically illustrating exemplary architecture of a general UMTS mobile-communication system.

Referring to FIG. 1, a UMTS system comprises a Core Network (CN) 100 and a plurality of Radio Network Subsystems (RNSs) 110 and 120. The RNSs 110 and 120 comprise a UMTS Terrestrial Radio Access Network (UTRAN). The CN 100 is comprised of a Serving GPRS Support Node (SGSN) and a Gateway GPRS Support Node (GGSN) to connect the UTRAN to a packet data network such as the Internet.

The RNSs 110 and 120 each comprise Radio Network Controllers (RNCs) 111 and 112, and a plurality of Node Bs 115, 113, 114 and 116. Specifically, the RNS 110 is comprised of the RNC 111 and the Node Bs 115 and 113, while the RNS 120 is comprised of the RNC 112 and the Node Bs 114 and 116. The RNCs 111 and 112 are classified as either a serving RNC, a drift RNC, and a control RNC, according to a role of their user equipments (UEs). The serving RNC manages information on a UE 130 and takes charge of data exchange with the CN 100, and the drift RNC directly wirelessly connects with the UE 130. The control RNC controls radio resources of each of the Node Bs.

The RNCs 111 and 112 are connected to the Node Bs 115, 113, 114 and 116, via interfaces called 'Iub', and the connection between the RNCs 111 and 112 is made by an interface called 'Iur'. Although not illustrated in FIG. 1, the connection between the UE 130 and the UTRAN is made by a Uu interface. The RNCs 111 and 112 allocate radio resources to the Node Bs 115, 113, 114 and 116 managed by themselves, and the Node Bs 115, 113, 114 and 116 provide the radio resources allocated from the RNCs 111 and 112 to the UE 130. The radio resources are configured cell by cell, and the radio resources provided by each Node B are radio resources associated with a specific cell managed by the corresponding Node B.

The UE 130 sets up a radio channel using radio resources associated with a specific cell managed by any one of the Node Bs 115, 113, 114 and 116, and exchanges data over the set radio channel. The UE 130 identifies physical channels generated per cell, and measures signal qualities of detectable physical channels of other cells except for the cell to which it is currently tuned. The measurement results reported from the UE 130 to the RNCs 111 and 112 comprise intra-frequency measurement results for the frequency channel to which the UE 130 is currently tuned, and inter-frequency measurement result for non-used frequency channels.

According to exemplary embodiments of the present invention, in transmitting a RACH message comprising the measurement results, the UE previously sets a particular threshold for inter-frequency measurement reporting on the RACH message, and reports a corresponding inter-frequency measurement result value through the RACH message only for the cells of the non-used frequency bands having signal quality higher than the preset threshold. Herein, the "non-used frequency bands" refer to the frequency bands unused by the UE, and the "cells of the non-used frequency bands" refer to the cells servicing the unused frequency bands.

If there is no cell of the non-used frequency band having the signal quality higher than the threshold, the UE does not include the inter-frequency measurement result information in the RACH message. In addition, for example, even though the 'Maximum number' is '4', if there is only one cell of the non-used frequency band having the signal quality higher than the preset threshold, the UE reports only the measurement result on the one non-used frequency band cell through the RACH message.

When reporting the measurement results on the cells of the non-used frequency bands having the signal quality higher than the threshold, the UE uses a short index referable to SIB11/12 for the cells of the non-used frequency bands, instead of using frequency information and primary CPICH information. That is, the UE transmits cell identification information and the measurement results or transmits only cell identification information, instead of transmitting the frequency information, primary CPICH information, and measurement results. The RNC acquires frequency information and primary CPICH information of the cell indicated by the cell identification information, by referring to the SIB11/12. If the UE transmits only the cell identification information without the measurement results, the RNC determines that the cell of the received cell identification information has at least the signal quality higher than the threshold.

Figure 2:
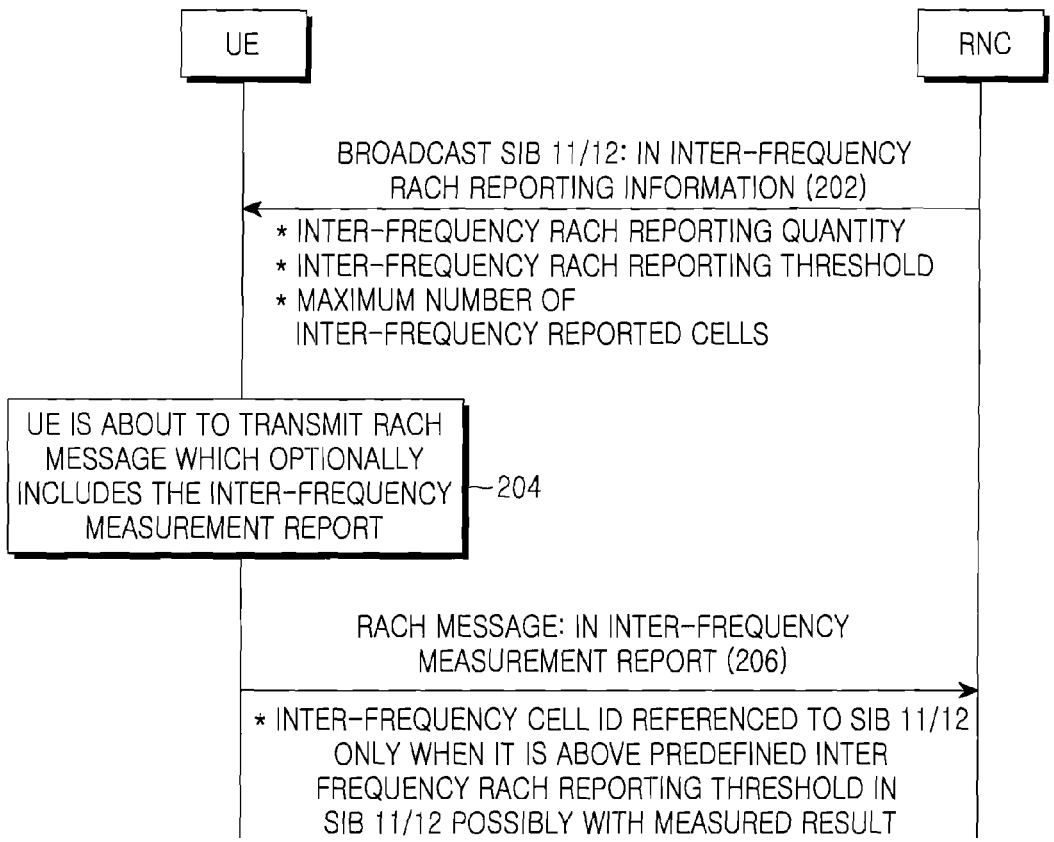
FIG. 2 is a diagram illustrating an exemplary operation of transmitting inter-frequency measurement results over a RACH according to an embodiment of the present invention.

FIG. 2 is a diagram illustrating an exemplary operation of transmitting inter-frequency measurement results over a RACH according to an embodiment of the present invention.

As illustrated in FIG. 2, in step 202, an RNC transmits inter-frequency RACH reporting quantity and maximum number of inter-frequency reported cells as inter-frequency RACH reporting information, which is inter-frequency measurement information, through SIB11/12. The inter-frequency RACH reporting quantity is a kind of information to be used for reporting the inter-frequency measurement results through a RACH message, and can indicate CPICH Ec/No or CPICH RSCP. The maximum number of inter-frequency reported cells indicates the maximum number of cells to which the inter-frequency measurement results will be transmitted through the RACH message. Additionally, the inter-frequency measurement control information comprises an inter-frequency RACH reporting threshold.

In step 204, a UE compares the measurement results measured for the cells of the non-used frequency bands with the threshold. In step 206, the UE transmits a RACH message comprising only the inter-frequency measurement result information for the cells of the non-used frequency bands having signal quality higher than the threshold to the RNC.

The UE applies the maximum number only for the cells of the non-used frequency bands having radio strength higher than a predetermined threshold. For example, for the maximum number=4, if the number of the non-used frequency cells whose inter-frequency measurement results are greater than the threshold is 2, the UE includes measurement result information for the 2 cells in the RACH message. If there is no cell of the non-used frequency having the measurement result greater than the threshold, the UE transmits no inter-frequency measurement result information through the RACH message. However, if the number of the non-used frequency cells having the measurement results greater than the threshold exceeds 4, the UE transmits measurement result information for 4 non-used frequency cells having the best radio strength through the RACH message. The measurement result information comprises cell identification information for the non-used frequency cells whose radio strength exceeds the threshold, and optionally comprises measurement results (i.e., Ec/No or RSCP of CPICH) of the non-used frequency cells.

The RACH message comprises a short index referenced to SIB11/12 as cell identification information. That is, the UE indicates the non-used frequency cells, using short cell indexes indicating the order of the non-used frequency cells included in an inter-frequency cell info list in SIB11/12. In the following description, the short cell index will be referred to as an 'inter-frequency cell ID'. The inter-frequency cell info list transmitted on SIB11/12 comprises cell information for 1 ~ maxCellMeas non-used frequency cells. In this case, short indexes of the non-used frequency cells are set to '0' to 'maxCellMeas-1', and the short indexes are used as inter-frequency cell IDs for the non-used frequency cells. In example, maxCellMeas is set to 32, so the inter-frequency cell ID has least 5 bits.

The RNC, upon receiving the RACH message, acquires frequency information and primary CPICH information for a corresponding cell, referring to the order of the cells included in the inter-frequency cell info list in the SIB11/12. This is possible because the RNC is already aware of the frequency information and primary CPICH information for all cells managed by itself. In addition, the RNC can be aware that even though no inter-frequency measurement result is included in the RACH message, at least the cells whose cell identification information is included in the RACH message have radio strength exceeding the threshold. For example, if the non-used frequency cells having radio strength exceeding the threshold are listed in the first, fifth and twelfth points of the inter-frequency cell info list, inter-frequency cell IDs of the non-used frequency cells are 0, 4 and 11, respectively. As another example, the RACH message may explicitly comprise measurement result values measured by the EU in addition to the cell identification information.

Tables 3 and 4 below show, by way of example, formats of inter-frequency measurement system information included in SIB11/12 to be used for reporting inter-frequency measurement results and inter-frequency measurement information included in the RACH message for inter-frequency measurement reporting according to an embodiment of the present invention. SIB11/12 comprises measurement control information used in the cell, wherein SIB11 is for an idle mode UE and SIB12 is for a connected mode UE. If there is no SIB12, the connected mode UE also refers to SIB11.

Table 3 consists of Table 3a and Table 3b. Table 3a shows a format of inter-frequency measurement system information included in SIB11/12, and Table 3b shows a format of inter-frequency RACH reporting information included in the inter-frequency measurement system information.

TABLE 3a

Inter-frequency measurement system information in SIB 11/12

| Information Element/ Group name | Multi | Type and reference | Semantics description |
|---|---|---|---|
| Inter-frequency cell info list | | Inter-frequency cell info list | |
| Inter-frequency RACH reporting information | | Inter-frequency RACH reporting information | |

TABLE 3a-continued

Inter-frequency measurement system information in SIB 11/12

| Information Element/ Group name | Multi | Type and reference | Semantics description |
|---|---|---|---|
| Maximum number of inter-frequency Reported cells on RACH | | Maximum number of reported cells on RACH | |

TABLE 3b

Inter-frequency RACH reporting information

| Information Element/ Group name | Multi | Type and reference | Semantics description |
|---|---|---|---|
| CHOICE mode | | | |
| >FDD | | | |
| >> Inter-frequency RACH reporting quantity | | Enumerated(CPICH Ec/N0, CPICH RSCP) | |
| >TDD | | | |
| >>Reporting quantity list | 1 to 2 | | |
| >>> Inter-frequency RACH reporting quantity | | Enumerated(Timeslot ISCP, Primary CCPCH RSCP) | |
| Inter-frequency RACH reporting threshold | | Integer(−115 . . . 0) | Ranges used depend on measurement quantity. CPICH Ec/No −24 . . . 0 dB CPICH/ Primary CCPCH RSCP −115 . . . −25dBm. |
| Maximum number of inter-frequency reported cells | | Integer(1 . . . 8) | Indicates the total number for all non-used frequencies |

In Table 3a, the inter-frequency cell info list comprises inter-frequency cell ID, frequency information, and primary CPICH information. In addition, inter-frequency RACH reporting information is control information referred to when inter-frequency measurement results are included in the RACH message. The inter-frequency RACH reporting information, as shown in Table 3b, comprises inter-frequency RACH reporting quantity, inter-frequency RACH reporting threshold, and maximum number of inter-frequency reported cells. The inter-frequency RACH reporting quantity and the maximum number of inter-frequency reported cells have been described above. That is, the inter-frequency RACH reporting quantity indicates a kind of the inter-frequency measurement results reported over the RACH, and the maximum number of inter-frequency reported cells indicates the maximum number of cells to which the inter-frequency measurement results will be transmitted over the RACH.

The threshold indicates a reference value used by the UE to include inter-frequency measurement information over the RACH. That is, the UE includes the inter-frequency measurement results in the RACH message only for the cells of the non-used frequencies having radio strength higher than the threshold. If there is no cell of the non-used frequency having radio strength higher than the threshold, the UE reduces signaling overhead because there is no need to include the inter-frequency measurement results in the RACH message. Therefore, the measurement results included in the RACH message are always greater than the threshold.

Table 4 below shows an information format of inter-frequency measurement results included in an RRC message transmitted by the UE over the RACH according to an embodiment of the present invention.

TABLE 4

Measured results on RACH

| Information Element/ group name | Multi | Type and reference | Semantics description |
|---|---|---|---|
| Measurement result for current cell | | | |
| Measurement results for monitored cells on non-used frequencies | 1 to <maxFreq> | | |
| >Inter-frequency cell id | | Integer(0 ... <maxCellMeas>−1) | |

In this case, monitored cells consist of neighbouring cells.

| Condition | Explanation |
|---|---|
| DCCH | This IE is optionally present when DCCH is used and not needed otherwise. |

Although it is shown in Table 4 that inter-frequency cell IDs referred to the order of a given inter-frequency cell info list are used for inter-frequency measurements of SIB11/12, the original unique cell IDs for identifying the whole cells in the mobile communication system may also be used in another embodiment of the present invention. Further, in embodiments of the present invention, the RACH message can further comprise only one of the inter-frequency cell ID and the cell ID, or comprise the corresponding measurement result along with any one of the inter-frequency cell ID and the cell ID.

Figure 3A:
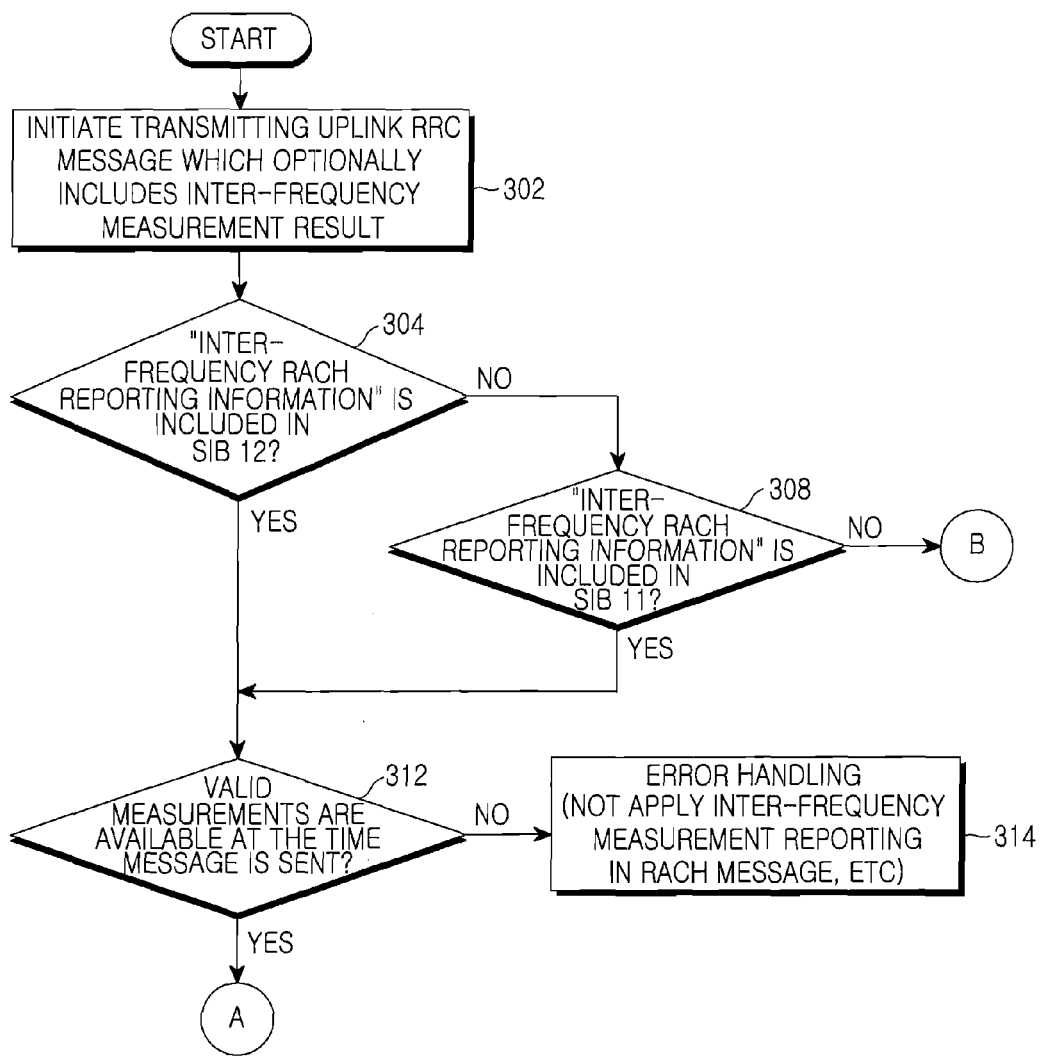
FIGS. 3A and 3B are flowcharts illustrating an exemplary UE operation of transmitting a RACH message for inter-frequency measurement reporting according to an embodiment of the present invention.
Figure 3B:
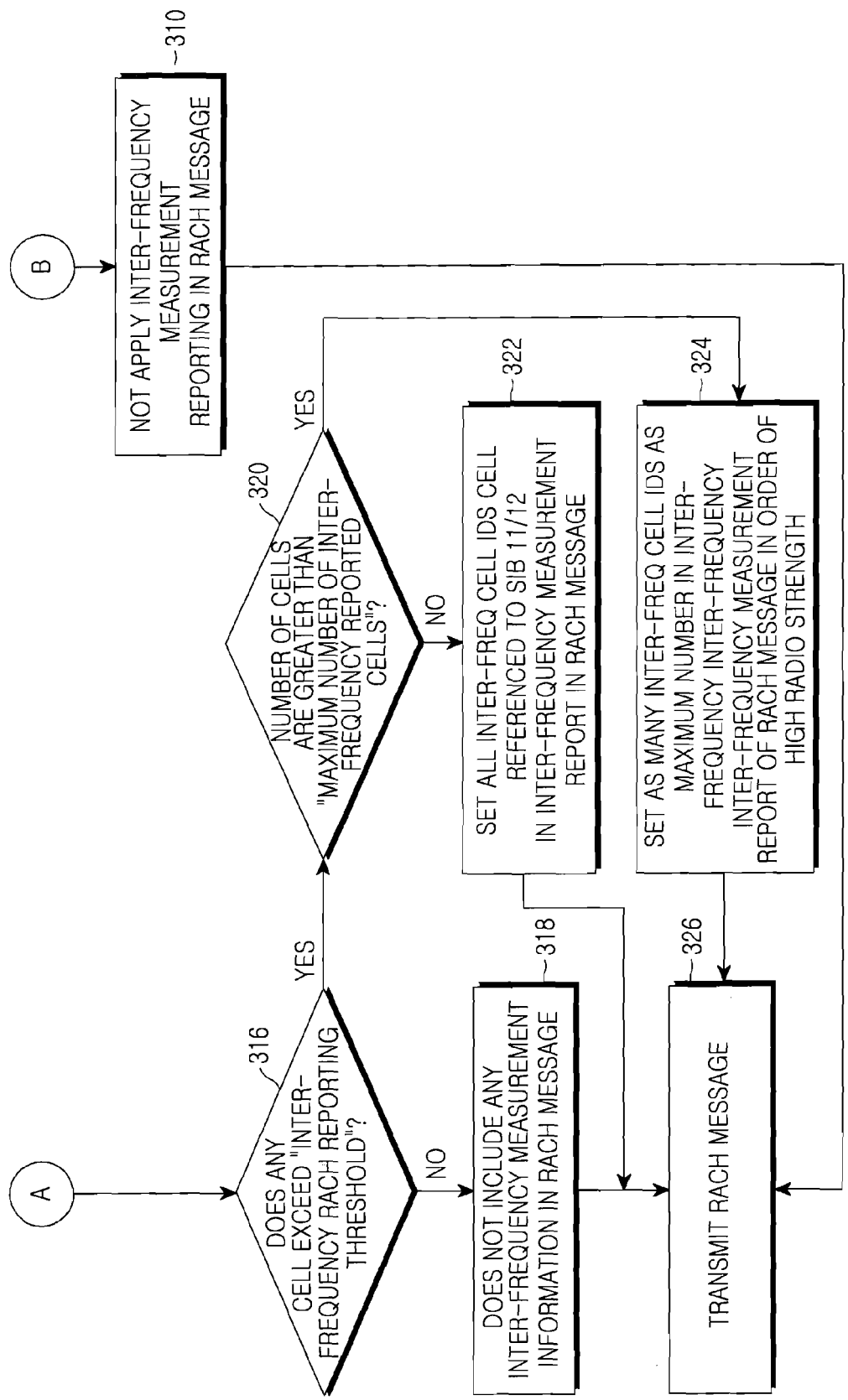

FIGS. 3A and 3B are flowcharts illustrating an exemplary UE operation of transmitting a RACH message for inter-frequency measurement reporting according to an embodiment of the present invention.

As illustrated in FIGS. 3A and 3B, in step 302, a UE determines to transmit a RACH message optionally comprising inter-frequency measurement reporting over a RACH. In step 304, the UE checks whether inter-frequency RACH reporting information is included in a SIB12 received from the system. If there is no inter-frequency RACH reporting information included in the SIB12, the UE checks in step 308 whether inter-frequency RACH reporting information is included in a SIB11 being broadcast in the current cell. If the SIB12 is not being broadcast in the current cell and if there is no inter-frequency RACH reporting information included in the SIB11, the UE includes no inter-frequency measurement result information in the in the RACH message in step 310.

If the inter-frequency RACH reporting information is included in the SIB12 in step 304, or if the inter-frequency RACH reporting information is included in step SIB11 in step 308, the UE checks in step 312 whether to include inter-frequency measurement reporting in the RACH message. If the inter-frequency measurement reporting is unavailable, the UE can perform error handling or transmit a RACH message with no inter-frequency measurement reporting in step 314.

However, if the inter-frequency measurements are available, the UE checks in step 316 whether there is any non-used frequency cell having radio strength higher than the inter-frequency RACH reporting threshold included in the inter-frequency RACH reporting information. If there is no non-used frequency cell having radio strength higher than the threshold, the UE includes no inter-frequency measurement result in the RACH message in step 318. However, if there are cells of the non-used frequencies having radio strength higher than the threshold, the UE compares the number of the cells of the non-used frequencies having radio strength higher than the threshold with the maximum number of inter-frequency reported cells, included in the inter-frequency RACH reporting information in step 320.

If the number of the cells of the non-used frequencies having radio strength higher than the threshold is not greater than the maximum number, the UE includes cell identification information of all the non-used frequency cells satisfying the condition of step 316 in the RACH message in order of the highest radio strength in step 322. In this case, the cell identification information indicates inter-frequency cell IDs indicating the cell order in the inter-frequency cell info list for inter-frequency measurements, set in the SIB11/12, or indicates cell IDs included in the inter-frequency cell info list, and may not include frequency information and primary CPICH information for the corresponding cells. In this case, the measurement results for the corresponding cells may be included in the RACH message. It is assumed herein for example, that the measurement results are not included in the RACH message.

However, if the number of the non-used frequency cells having radio strength higher than the threshold is greater than the maximum number, the UE includes cell identification information for as many cells as the maximum number among the non-used frequency cells satisfying the condition of step 316 in the RACH message in order of the highest radio strength in step 324. In this case also, the cell identification information, as described in step 322, indicates as many inter-frequency cell IDs or cell IDs as the maximum number, and the RACH message can comprise measurement results for the corresponding cells.

In step 326, the RACH message established in steps 318, 324 or 310, is then transmitted to an RNC over a RACH.

Figure 4:
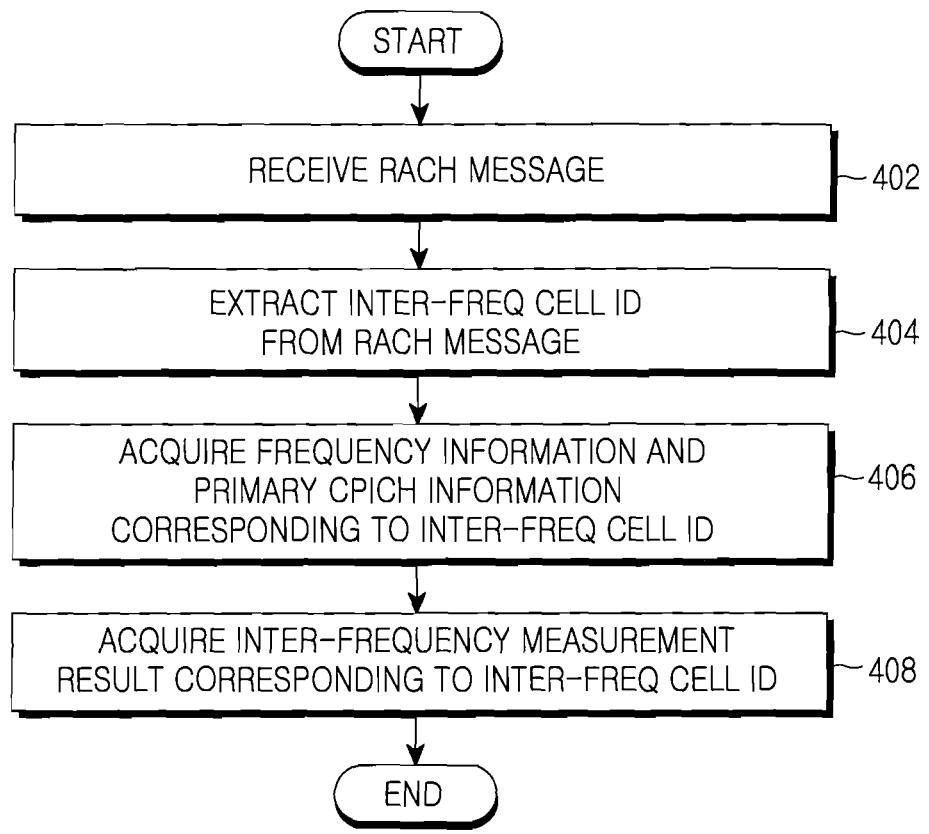
FIG. 4 is a flowchart illustrating an exemplary RNC operation of receiving a RACH message for inter-frequency measurement reporting according to an embodiment of the present invention.

FIG. 4 is a flowchart illustrating an exemplary RNC operation of receiving a RACH message for inter-frequency measurement reporting according to an embodiment of the present invention. A description of an RNC operation of transmitting inter-frequency RACH reporting information comprising an inter-frequency cell info list and an inter-frequency RACH reporting threshold on SIB11/12 will be omitted herein.

As illustrated in FIG. 4, an RNC receives a RACH message from a UE over a RACH in step 402, and extracts at least one inter-frequency cell ID (or cell ID) associated with the inter-frequency measurement from the RACH message in step 404. If the RACH message includes no inter-frequency cell ID (or cell ID), the RNC determines that the RACH message includes no inter-frequency measurement result information.

In step 406, the RNC acquires cell information corresponding to the extracted inter-frequency cell ID, i.e., frequency information and primary CPICH information, referring to its own inter-frequency cell info list. In step 408, the RNC acquires inter-frequency measurement results corresponding to the inter-frequency cell ID, referring to the RACH message. Specifically, in step 408, if there is no inter-frequency measurement result included in the RACH message, the RNC determines that a cell corresponding to the inter-frequency cell ID has radio strength exceeding the threshold. Otherwise, if there is any inter-frequency measurement result included in the RACH message, the RNC analyzes and acquires the inter-frequency measurement results included in the RACH message.

The acquired inter-frequency measurement results are used for analyzing a communication environment of the UE and determining whether to perform handover.

Figure 5:
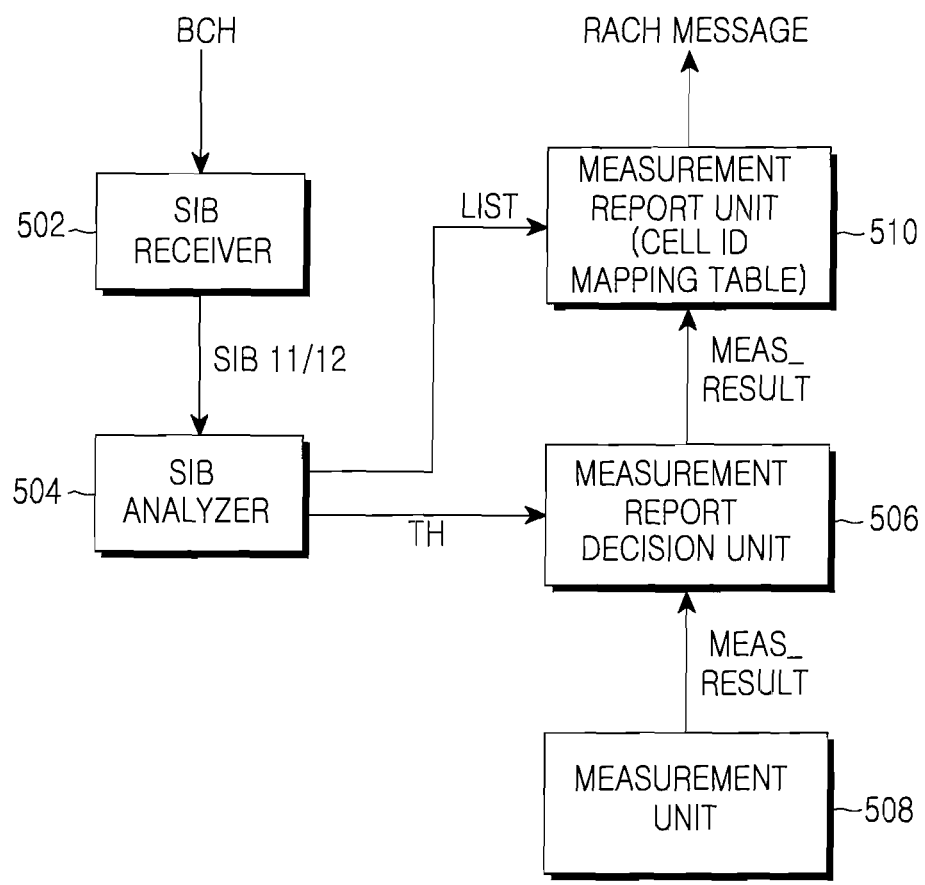
FIG. 5 is a diagram illustrating an exemplary UE structure for transmitting a RACH message for inter-frequency measurement reporting according to an embodiment of the present invention.

FIG. 5 is a diagram illustrating an exemplary UE structure for transmitting a RACH message for inter-frequency measurement reporting according to an embodiment of the present invention.

As illustrated in FIG. 5, an exemplary UE comprises a SIB receiver 502, a SIB analyzer 504, a measurement report decision unit 506, a measurement unit 508, and a measurement report unit 510. The SIB receiver 502 receives SIB11/12 over a broadcast channel (BCH), and the SIB analyzer 504 acquires inter-frequency RACH reporting information necessary for inter-frequency measurement reporting from the SIB11/12. The inter-frequency RACH reporting information comprises an inter-frequency cell info list and an inter-frequency RACH reporting threshold 'Th'. The inter-frequency cell info list is delivered to the measurement report unit 510, and the threshold 'Th' is delivered to the measurement report decision unit 506.

The measurement unit 508 measures radio strength, i.e., Ec/No or RSCP, of a CPICH received from each of the cells of frequencies unused by the UE (i.e., the non-used frequencies). The measurement report decision unit 506 compares the measurement results from the measurement unit 508 with the threshold to determine whether to report the measurement results. If the measurement result for at least one cell does not exceed the threshold, the measurement report decision unit 506 determines not to perform the measurement reporting. However, if the measurement result for at least one cell exceeds the threshold, the measurement report decision unit 506 determines to perform the measurement reporting and delivers the measurement result to the measurement report unit 510.

The measurement report unit 510 stores a cell ID mapping table generated referring to the inter-frequency cell info list, searches the cell ID mapping table for inter-frequency cell IDs corresponding to the measurement results received from the measurement report decision unit 506, especially to the measurement results of the cells having radio strength exceeding the threshold, and generates measurement result information including the searched inter-frequency cell IDs. The measurement result information comprises inter-frequency cell IDs, the number of which does not exceed the maximum number determined by the SIB11/12. In addition, the measurement result information can comprise corresponding measurement results together with the inter-frequency cell ID. The measurement result information is included in a RACH message and transmitted to an RNC over a RACH.

Figure 6:
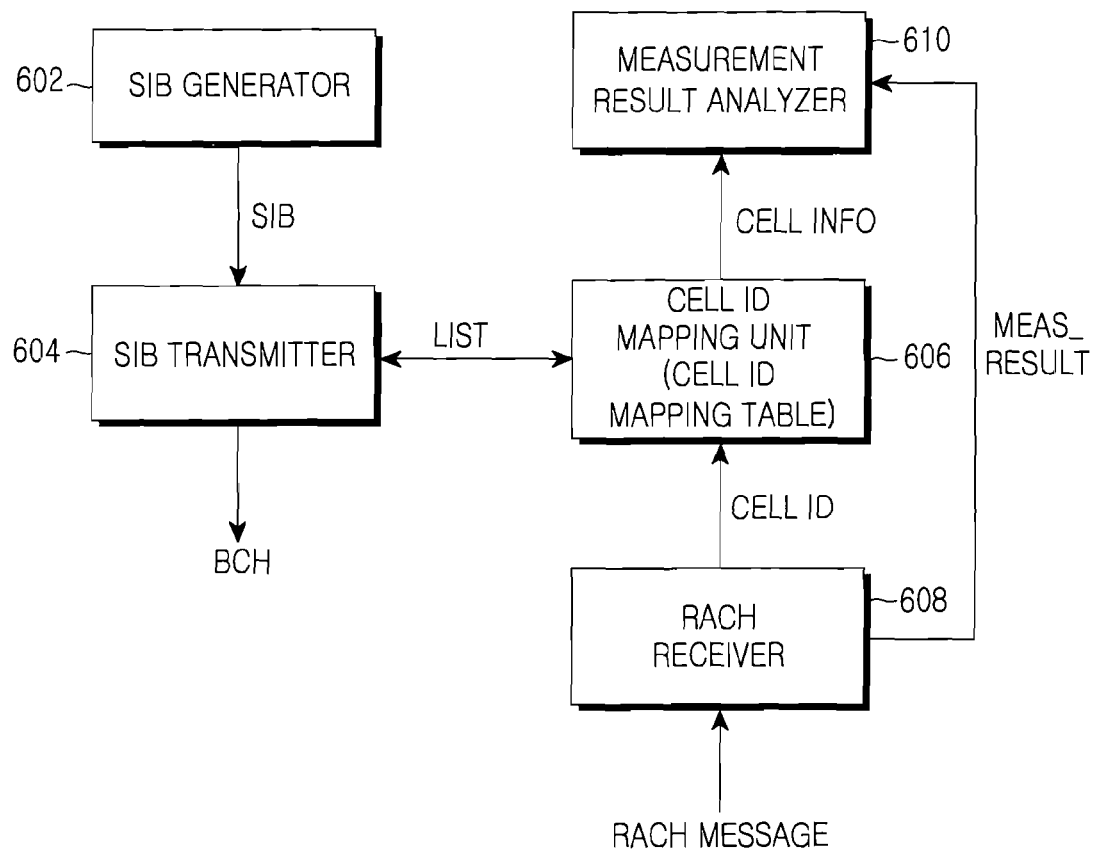
FIG. 6 is a diagram illustrating an exemplary RNC structure for receiving a RACH message for inter-frequency measurement reporting according to an embodiment of the present invention.

FIG. 6 is a diagram illustrating an exemplary RNC structure for receiving a RACH message for inter-frequency measurement reporting according to an embodiment of the present invention.

As illustrated in FIG. 6, an exemplary RNC comprises a SIB generator 602, a SIB transmitter 604, a cell ID mapping unit 606, a RACH receiver 608, and a measurement result analyzer 610. The SIB generator 602 generates SIB11/12 including inter-frequency RACH reporting information as the system information necessary for system access for each of a plurality of cells controlled. The generated SIB11/12 is transmitted by the SIB transmitter 604 to the idle mode UEs and the connected mode UEs located in the cells over a BCH. The inter-frequency RACH reporting information comprises an inter-frequency cell info list and an inter-frequency RACH reporting threshold. The inter-frequency cell info list is shared between the SIB transmitter and the cell ID mapping unit 606 and is used for generating a cell ID mapping table.

The RACH receiver 608 receives a RACH message from a UE over a RACH, and determines whether there is any inter-frequency measurement result information included in the RACH message. If the inter-frequency measurement result information is included in the RACH message, the inter-frequency cell IDs included in the inter-frequency measurement result information are provided to the cell ID mapping unit 606. If the measurement results corresponding to the inter-frequency cell IDs are included in the inter-frequency measurement result information, the measurement results are delivered to the measurement result analyzer 610.

The cell ID mapping unit 606 acquires cell information corresponding to each of the inter-frequency cell IDs included in the inter-frequency measurement result information, i.e. acquires frequency information and primary CPICH information, referring to the cell ID mapping table, and provides the acquired cell information to the measurement result analyzer 610. The measurement result analyzer 610 receives the cell information and determines whether measurement results corresponding to the cell information have been provided from the RACH receiver 608. If the measurement results corresponding to the cell information have not been provided, the measurement result analyzer 610 determines that the cell corresponding to the cell information has radio strength exceeding the threshold notified through the SIB11/12. However, if the measurement results corresponding to the cell information have been provided, the measurement result analyzer 610 analyzes the measurement results for the cells corresponding to the cell information. The determined measurement results are used for determining whether a communication environment of the UE is good and whether there is a need for handover.

A description has been made of an exemplary operation performed when there is no Iur interface for the UE. If a serving RNC (SRNC) for controlling radio resources of the UE is different from a control RNC (CRNC), i.e., a drift RNC (DRNC), for controlling the cell where the UE is located, an Iur interface between the SRNC and CRNC exists. In this case, the SRNC cannot acquire frequency information and primary CPICH information using only the inter-frequency cell IDs in the RACH message. This is because the cell where the UE is currently located is controlled not by the SRNC, but by the CRNC, and SIB11/12 including the inter-frequency cell info list referred to by the inter-frequency cell IDs is generated by the CRNC. If the SRNC is different from the CRNC in this way, the SIB generator 602 and the SIB transmitter 604, referring to FIG. 6, belong to the CRNC that transmits a SIB to the cell where the UE is located, and the RACH receiver 608, the cell index (ID) mapping unit 606 and the measurement result analyzer 610 belong to the SRNC that analyzes the measurement results of the UE and controls hard handover. Then, the cell ID mapping unit 606, because it cannot share the inter-frequency cell info list with the SIB transmitter 604, acquires cell information corresponding to the inter-frequency cell ID through the following exemplary embodiments of the present invention.

Before a description of an exemplary operation performed when the Iur interface exists is given, a description will first be made of exemplary signaling of the Iur interface for enabling an operation of embodiments of the present invention. In the following description, a Cell Update message will be used as an example of the RACH message. An SRNC performs cell update according to the Cell Update message, and determines whether to perform hard handover of the UE according to measurement result information included in the Cell Update message. If the SRNC determines to perform hard handover, it sets up a dedicated channel to the UE and performs hard handover according to the cell information acquired from the CRNC.

Figure 7:
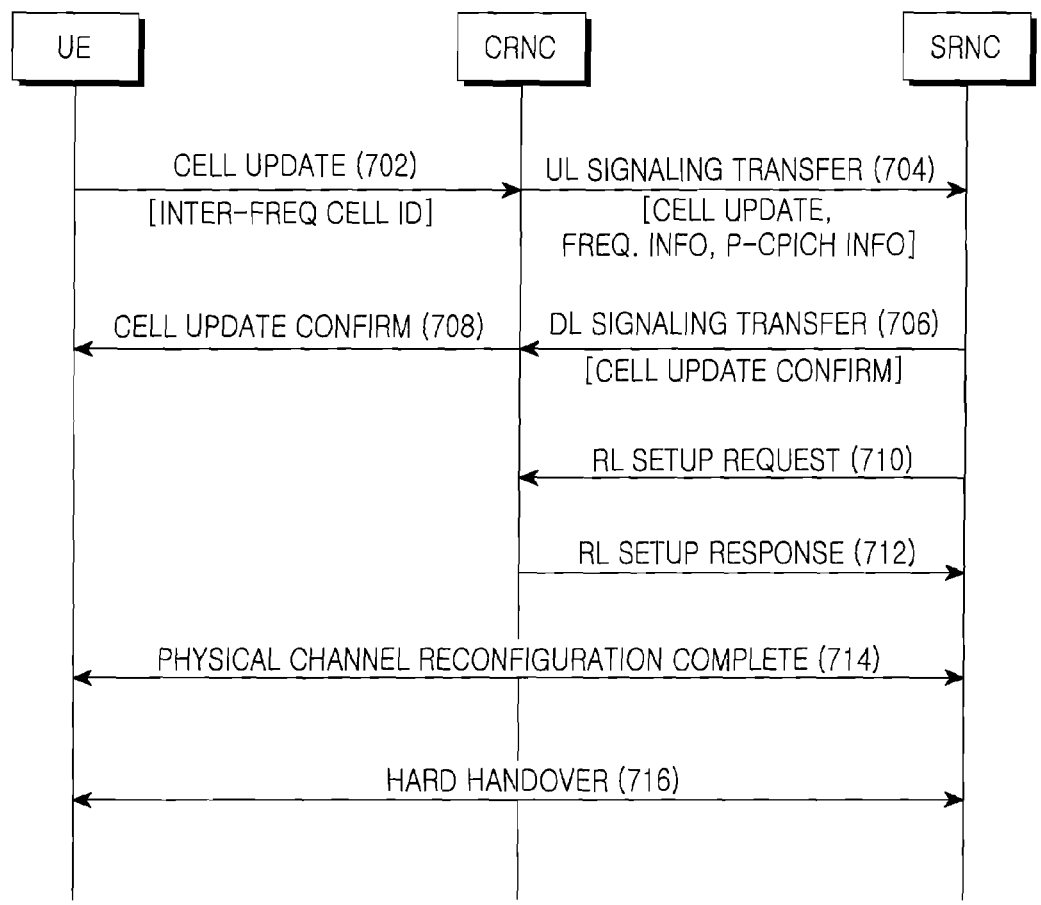
FIG. 7 is a message flow diagram for illustrating exemplary signaling between an SRNC and a CRNC according to a first embodiment of the present invention.

FIG. 7 is a message flow diagram for illustrating exemplary signaling between an SRNC and a CRNC according to a first embodiment of the present invention. Herein, a UE is located in a cell controlled by a CRNC and communicates with a CN via an SRNC. Then, there is an Iur interface between the SRNC and the CRNC.

As illustrated in FIG. 7, in step 702, a UE sets, in a Cell Update message, measurement results for the cells of the non-used frequencies having radio strength higher than a 'threshold referred to SIB11/12' as an inter-frequency cell IDs based on an inter-frequency cell info list in the SIB11/12, and transmits the Cell Update message to a CRNC. In step 704, the CRNC forwards the Cell Update message to an SRNC along with an uplink (UL) signaling transfer message. At this moment, the CRNC converts the inter-frequency cell IDs into cell information of the cell corresponding to the inter-frequency cell IDs, i.e., frequency information and primary CPICH information, and includes the cell information in the UL signaling transfer message. In step 706, the SRNC performs cell update according to the Cell Update message included in the UL signaling transfer message, and transmits a downlink (DL) signaling transfer message indicating cell update completion to the CRNC. In step 708, the CRNC transmits a Cell Update Confirm message to the UE according to the DL signaling transfer message.

The SRNC determines to perform hard handover according to the measurement results included in the UL signaling transfer message, and exchanges a Radio Link (RL) setup request message and an RL setup response message with the CRNC in steps 710 and 712, to allow the UE to transition to a Cell—Dedicated Channel (CELL_DCH) state. In step 714, the SRNC receives a Physical Channel reconfiguration complete message indicating setup of a dedicated channel from the UE. Thereafter, in step 716, the UE performs hard handover to a target cell corresponding to the frequency information and primary CPICH information included in the UL signaling transfer message according to an indication of the SRNC.

Figure 8:
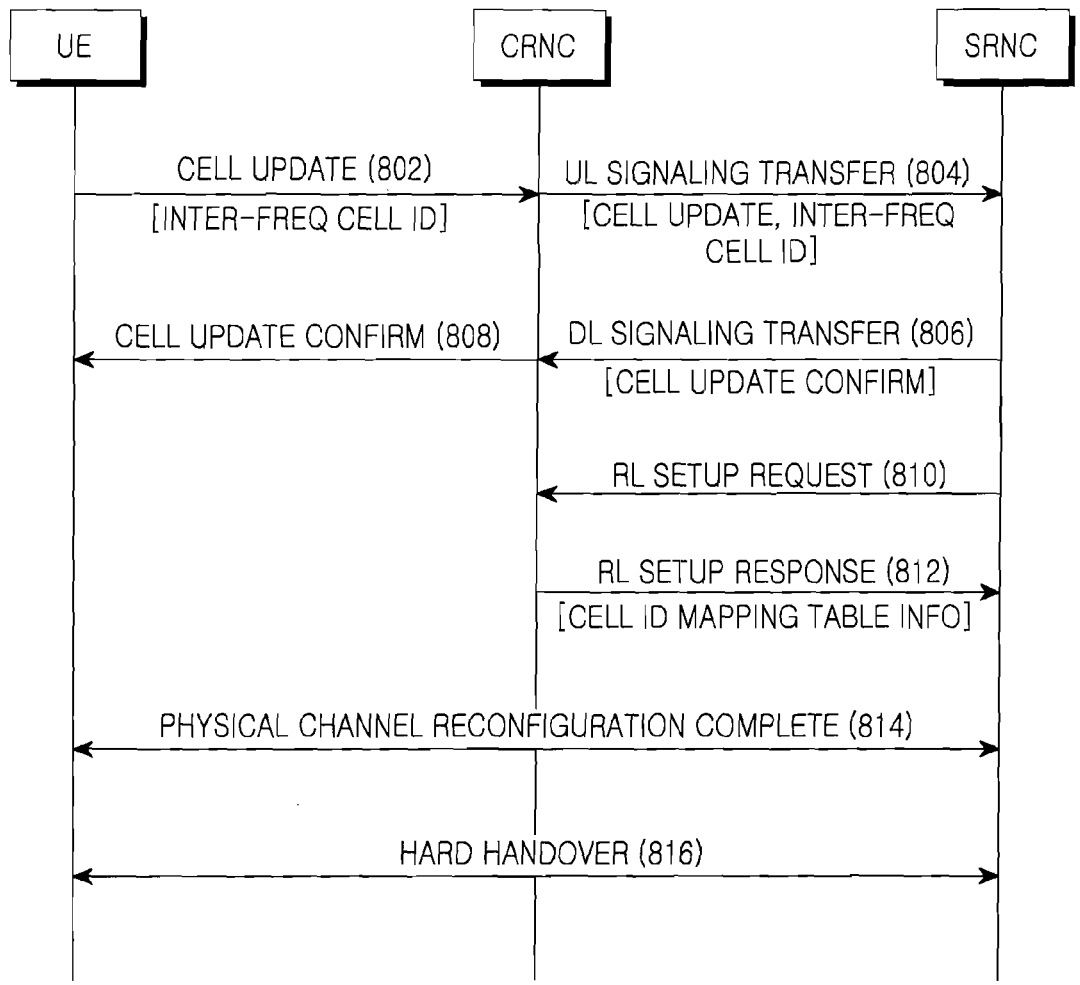
FIG. 8 is a message flow diagram for illustrating exemplary signaling between an SRNC and a CRNC according to a second embodiment of the present invention.

FIG. 8 is a message flow diagram for illustrating exemplary signaling between an SRNC and a CRNC according to a second embodiment of the present invention. Herein, a UE is located in a cell controlled by a CRNC and communicates with a CN via an SRNC. In the following description, a Cell Update message is used as an example of the RACH message.

As illustrated in FIG. 8, in step 802, a UE sets, in a Cell Update message, measurement results for the cells of the non-used frequencies having radio strength higher than a 'threshold referred to SIB11/12' as an inter-frequency cell IDs based on an inter-frequency cell info list in the SIB11/12, and transmits the Cell Update message to a CRNC. In step 804, the CRNC forwards the intact Cell Update message to an SRNC along with a UL signaling transfer message. At this moment, the CRNC does not convert the inter-frequency cell IDs into cell information, and transparently transmits the Cell Update message received from the UE along with a UL signaling transfer message. The SRNC cannot analyze the inter-frequency cell IDs received through the UL signaling transfer message because it does not have an inter-frequency cell info list associated with the cell where the UE is located. In step 806, the SRNC performs cell update according to the UL signaling transfer message, and transmits a DL signaling transfer message indicating cell update completion to the CRNC. In step 808, the CRNC transmits a Cell Update Confirm message to the UE according to the DL signaling transfer message.

The SRNC determines to perform hard handover according to the measurement results included in the UL signaling transfer message, and transmits an RL setup request message for setup of a dedicated channel for the UE to the CRNC in step 810, and receives an RL setup response message from the CRNC in response to the RL setup request message in step 812. In step 814, the UE transmits a Physical Channel reconfiguration complete message indicating setup of a dedicated channel to the SRNC.

The CRNC includes, in the RL setup response message, cell ID mapping table information for inter-frequency cell IDs included in the Cell Update message set in step 802. The cell ID mapping table information comprises cell information such as the inter-frequency cell IDs and their associated frequency information and primary CPICH information. The SRNC allows the UE to perform hard handover to a target cell based on the frequency information and primary CPICH information in step 816, using the cell ID mapping table information acquired through the RL setup response message.

Figure 9:
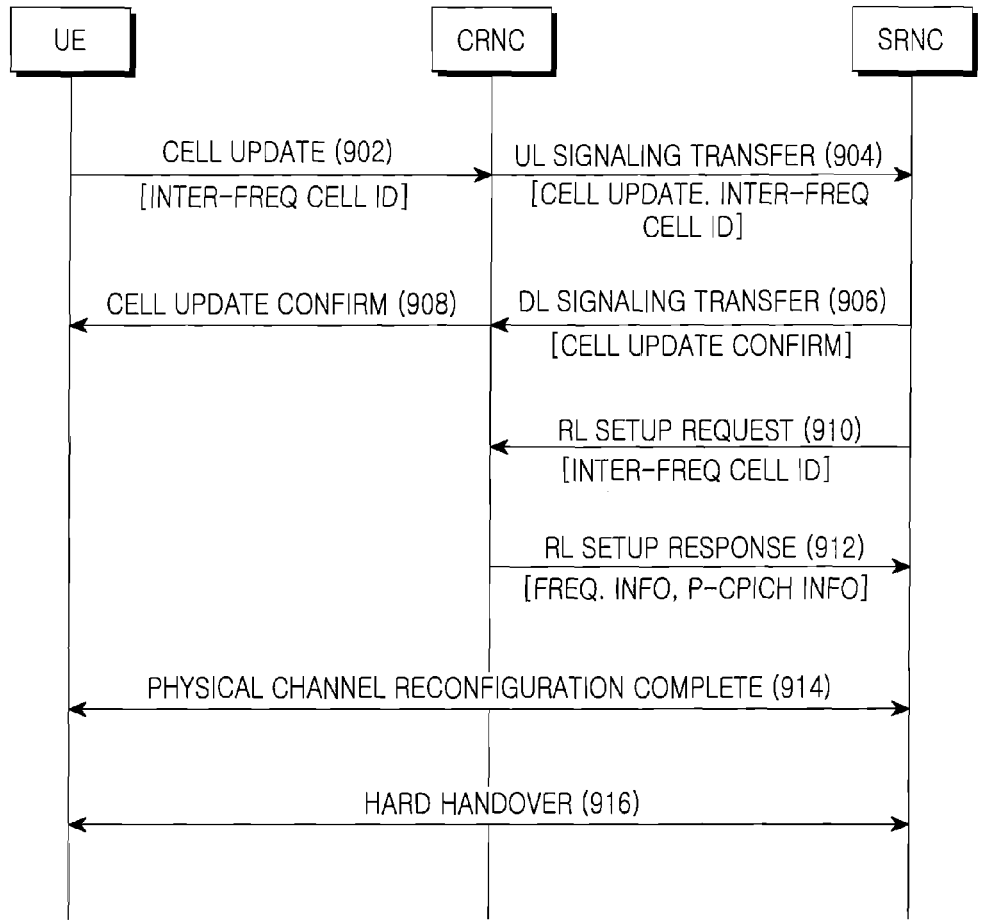
FIG. 9 is a message flow diagram for illustrating exemplary signaling between an SRNC and a CRNC according to a third embodiment of the present invention.

FIG. 9 is a message flow diagram for illustrating exemplary signaling between an SRNC and a CRNC according to a third embodiment of the present invention. Herein, a UE is located in a cell controlled by a CRNC and communicates with a CN via an SRNC. In the following description, a Cell Update message is used as an example of the RACH message.

As illustrated in FIG. 9, in step 902, a UE sets, in a Cell Update message, measurement results for the cells of the non-used frequencies having radio strength higher than a 'threshold referred to SIB11/12' as an inter-frequency cell IDs based on an inter-frequency cell info list in the SIB11/12, and transmits the Cell Update message to a CRNC. In step 904, the CRNC forwards the intact Cell Update message to an SRNC along with a UL signaling transfer message. At this moment, the CRNC does not convert the inter-frequency cell IDs into cell information, and transparently transmits the Cell Update message received from the UE along with a UL signaling transfer message. The SRNC cannot analyze the inter-frequency cell IDs received through the UL signaling transfer message because it does not have an inter-frequency cell info list associated with the cell where the UE is located. In step 906, the SRNC performs cell update according to the UL signaling transfer message, and transmits a DL signaling transfer message indicating cell update completion to the CRNC. In step 908, the CRNC transmits a Cell Update Confirm message to the UE according to the DL signaling transfer message.

The SRNC determines to perform hard handover according to the measurement results included in the UL signaling transfer message, and transmits an RL setup request message for setup of a dedicated channel for the UE to the CRNC in step 910. The CRNC transmits an RL setup response message to the SRNC in response to the RL setup request message in step 912. In step 914, the UE transmits a Physical Channel reconfiguration complete message indicating setup of a dedicated channel to the SRNC.

The SRNC includes an inter-frequency cell ID of a target cell for hard handover in the RL setup request message, and the CRNC receiving the RL setup request message transmits cell information for the inter-frequency cell ID of the target cell, such as frequency information and primary CPICH information, through the RL setup response message. The SRNC analyzes the frequency information and the primary CPICH information through the RL setup response message, and allows the UE to perform hard handover to the target cell based on the frequency information and primary CPICH information in step 916.

Figure 10:
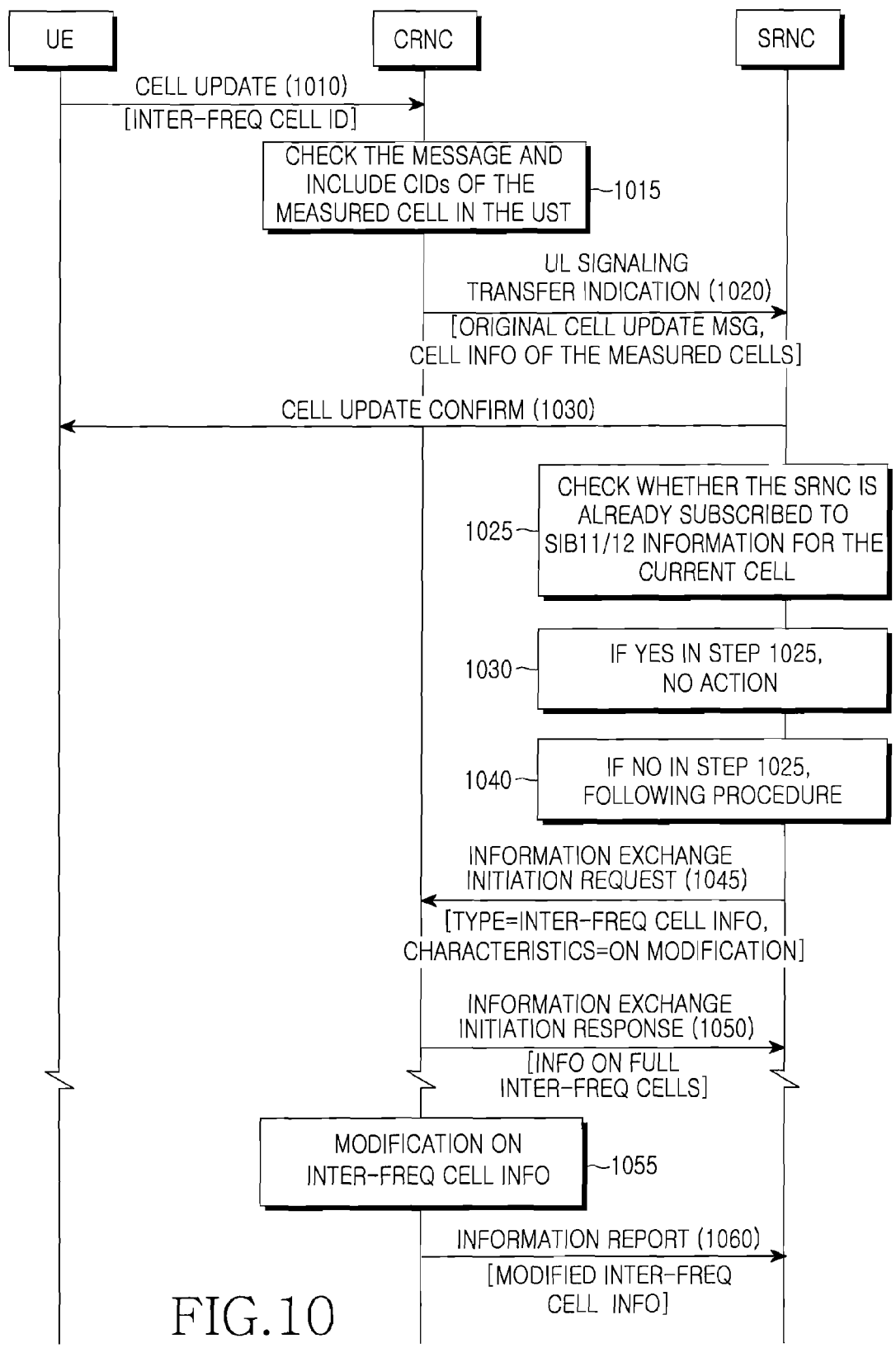
FIG. 10 is a message flow diagram for illustrating exemplary signaling between an SRNC and a CRNC according to a fourth embodiment of the present invention.

FIG. 10 is a message flow diagram for illustrating exemplary signaling between an SRNC and a CRNC according to a fourth embodiment of the present invention. Herein, a UE is located in a cell controlled by a CRNC. The CRNC controls the cell where the UE is currently located, and an SRNC controls radio resources of the UE and connects the UE to a CN.

As illustrated in FIG. 10, in step 1010, a UE transmits a Cell Update message to a CRNC as an example of a RACH message. The Cell Update message, as described with reference to FIG. 2, comprises measurement results for the cells having radio strength exceeding a threshold among neighboring cells of the non-used frequency bands, and the measurement results have inter-frequency cell IDs indicating cell order in an inter-frequency cell info list given for inter-frequency measurement in SIB11/12, for the cells. The Cell Update message comprises 'Inter-frequency cell indication-SIB11' and/or 'Inter-frequency cell indication-SIB12', which are indicators indicating an inter-frequency cell info list of which SIB out of SIB11 and SIB12 the inter-frequency cell IDs has referred to, and inter-frequency cell IDs based on the indicators. There can be a plurality of inter-frequency cell IDs in the Cell Update message, and they are in order of the cells having the highest radio strength.

In step 1015, the CRNC checks the Cell Update message. If the Cell Update message includes measurement results for the non-used frequency cells, the CRNC transmits DL/UL UTRA Absolute Radio Frequency Channel Number (UARFCN) and Primary Common Pilot Channel (P-CPICH) information indicating frequency information, and Primary Scrambling Code information indicating primary CPICH information, as complete cell information corresponding to the inter-frequency cell IDs included in the measurement results, in addition to a UL Signaling Transfer Indication message, in step 1020. The UL Signaling Transfer Indication message is used when the DRNC or the CRNC forwards messages transmitted over a CCCH to the SRNC. That is, the Cell Update message is forwarded to the SRNC along with the UL signaling transfer indication message, and no direct modification is made on the Cell Update message.

A difference between the fourth embodiment of FIG. 10 and the first embodiment of FIG. 7 will now be described below. In the first embodiment of FIG. 7, the CRNC directly modifies the RACH message. That is, the CRNC replaces inter-frequency cell IDs, which are RACH measurement results, included in the RACH message such as the Cell Update message, with the corresponding cell information, and then forwards the modified RACH message through the UL Signaling Transfer Indication message. However, in the fourth embodiment of FIG. 10, the CRNC forwards the Cell Update message to the SRNC without modification. The CRNC includes cell information (DL UARFCN, UL UARFCN, and Primary Scrambling Code) corresponding to the inter-frequency cell IDs, which are RACH measurement results, included in the Cell Update message, as an additional field, and transmits the Cell Update message to the SRNC.

Table 5 below shows, by way of example, a format of the UL Signaling Transfer Indication message according to the fourth embodiment of the present invention. In accordance with FIG. 2, cell information (DL UARFCN, UL UARFCN, and Primary Scrambling Code) corresponding to the inter-frequency cell IDs included in the RACH message (i.e., Cell Update message) is included in an Inter-frequency Cell List of the UL Signaling Transfer Indication message. A description of information elements (IEs) unrelated to embodiments of the present invention will be omitted herein for clarity.

TABLE 5

| IE/Group Name | Presence | Range | Semantics Description | Criticality | Assigned Criticality |
|---|---|---|---|---|---|
| Inter-frequency Cell List | | 0 ... <maxCellsMeas> | | GLOBAL | ignore |
| >DL UARFCN | M | | | — | |
| >UL UARFCN | O | | | — | |
| >Primary Scrambling Code | M | | | — | |

As described above, UARFCN indicates a frequency used in the corresponding cell, and UL UARFCN and DL UARFCN indicate frequency bands for an uplink and a downlink, respectively. Primary Scrambling Code indicates a scrambling code used for a P-CPICH of the corresponding cell, and can be used as a cell identifier. In addition, 'maxCellsMeas' indicates the maximum number of non-used frequency cells measurable by the UE, and as a result, it denotes the number of cells included in an inter-frequency cell info list included in the SIB11/12.

If the inter-frequency cell IDs for the several non-used frequency cells are included in the RACH message as the inter-frequency measurement results, several cell information can be included in the UL Signaling Transfer Indication message in order of the inter-frequency cell IDs. However, if no inter-frequency cell ID is included in the RACH message as the inter-frequency measurement results, no cell information is included in the UL Signaling Transfer Indication message.

In FIG. 10, 'Cell Info of the Measured Cells' denoted in step 1020 indicates cell information included in the UL Signaling Transfer Indication message. In step 1030, a Cell Update Confirm message is transmitted from the SRNC to the UE via the CRNC as a response message to the Cell Update message.

In step 1025, the SRNC checks whether it already sustains the entire mapping information of cell information per inter-frequency cell ID associated with the cell (i.e., current cell) being controlled by the CRNC, based on the RACH measurement results of the RACH message included in the UL Signaling Transfer Indication message. Herein, the 'entire mapping information' refers to a mapping list of the cell information per inter-frequency cell ID for all cells included in the inter-frequency cell info list of the SIB11/12 transmitted from the current cell. In the check process, the SRNC checks whether it first receives the UL Signaling Transfer Indication message including the cell information for the inter-frequency cell IDs from the CRNC.

If the SRNC was maintaining the entire mapping information of the cell information per inter-frequency cell ID associated with the current cell when it received the UL Signaling Transfer Indication message, the SRNC ends the update procedure of the entire mapping information in step 1030, and proceeds to a handover process of determining whether to perform hard handover for the UE. However, in step 1040, if the SRNC was not maintaining the entire mapping information of the cell information per inter-frequency cell ID associated with the current cell when it received the UL Signaling Transfer Indication message, i.e., if the SRNC first receives the UL Signaling Transfer Indication message including the cell information for the inter-frequency cell IDs from the CRNC, the SRNC sends a request for the entire mapping information of the cell information per inter-frequency cell ID associated with the current cell to the CRNC through an Information Exchange Initiation Request message in step 1045. The Information Exchange Initiation Request message is commonly used by one RNC to send a request for start of information exchange to another RNC. Table 6 below shows, by way of example, a format of the Information Exchange Initiation Request message.

TABLE 6

| IE/Group Name | Presence | Range | Semantics Description | Criticality | Assigned Criticality |
|---|---|---|---|---|---|
| Message Type | M | | | YES | reject |
| Transaction ID | M | | | — | |
| Information Exchange ID | M | | | YES | reject |
| CHOICE Information Exchange Object Type | M | | | YES | reject |
| Information Type | M | | | YES | reject |
| Information Report Characteristics | M | | | YES | reject |

The Information Exchange Initiation Request message comprises an 'Information Type' IE, and the SRNC requests the entire mapping information of the cell information per inter-frequency cell ID associated with a specific cell through the 'Information Type' IE. For this purpose, the 'Information Type' IE is set such that it indicates 'Inter-frequency Cell Information'. That is, in order to send a request for the entire mapping information of the cell information per inter-frequency cell ID associated with the specific cell to the CRNC, the SRNC sets an 'Information Type Item' IE of the 'Information Type' IE included in the Information Exchange Initiation Request message such that it indicates "Inter-frequency Cell Information". The 'Information type' IE is used as an identifier indicating the requested information. Table 7 below shows, by way of example, an exemplary format of the 'Information Type' IE included in the Information Exchange Initiation Request message.

TABLE 7

| IE/Group Name | Presence | Range | IE Type and Reference | Semantics Description |
|---|---|---|---|---|
| Information Type Item | M | | ENUMERATED (UTRAN Access Point Position with Altitude, UTRAN Access Point Position, IPDL Parameters, GPS Information, DGPS Corrections, GPS RX Pos, SFN-SFN Measurement | For information exchange on the Iur-g interface, only the Cell Capacity Class is used. |

TABLE 7-continued

| IE/Group Name | Presence | Range | IE Type and Reference | Semantics Description |
|---|---|---|---|---|
| | | | Reference Point Position, . . . , Cell Capacity Class, NACC Related Data, MBMS Bearer Service Full Address, Inter-frequency Cell Information) | |

In addition, the SRNC can set an 'Information Report Characteristics' IE of the Information Exchange Initiation Request message such that it indicates "On Modification". Each time the inter-frequency cell info list included in the SIB11/12 of the specific cell is changed, the CRNC transmits the entire mapping information of the cell information per inter-frequency cell ID based on the changed inter-frequency cell info list to the SRNC through an Information Report message. In this way, the SRNC always maintains the latest entire mapping information of the cell information per inter-frequency cell ID associated with the specific cell. The 'Information Report Characteristics' IE indicates in which way the information requested by the Information Exchange Initiation Request message should be reported, and a format thereof is shown in Table 8 below, by way of example.

TABLE 8

| IE/Group Name | Presence | Range | Semantics Description |
|---|---|---|---|
| CHOICE Information Report Characteristics Type | M | | |
| >On Demand | | | |
| >Periodic | | | |
| >>CHOICE Information Report Periodicity Scale | M | | The frequency with which the Node B shall send information reports. |
| >>>minute | | | |
| >>>>Report Periodicity Value | M | | |
| >>>hour | | | |
| >>>>Report Periodicity Value | M | | |
| > On Modification | | | |
| >>Information Threshold | O | | |

Returning to FIG. 10, in step 1050, the CRNC transmits an Information Exchange Initiation Response message to the SRNC in response to the Information Exchange Initiation Request message. If the SRNC sent a request for the entire mapping information of the cell information per inter-frequency cell ID associated with a specific cell to the CRNC in step 1045, the Information Exchange Initiation Response message comprises the information requested by the SRNC. Table 9 below shows, by way of example, an exemplary format of the Information Exchange Initiation Response message.

TABLE 9

| IE/Group Name | Presence | Range | Semantics Description | Criticality | Assigned Criticality |
|---|---|---|---|---|---|
| Message Type | M | | | YES | reject |
| Transaction ID | M | | | — | |
| Information Exchange ID | M | | | YES | ignore |

TABLE 9-continued

| IE/Group Name | Presence | Range | Semantics Description | Criticality | Assigned Criticality |
|---|---|---|---|---|---|
| CHOICE Information Exchange Object Type | O | | | YES | ignore |
| >Cell | | | | | |
| >>Requested Data Value | M | | | | |
| >Additional Information Exchange Object Types | | | | | |
| >>MBMS Bearer Service | | | | | |
| >>>MBMS Bearer Service List | | 1 ... <maxnoofMBMS> | | GLOBAL | ignore |
| >>>>TMGI | M | | | | |
| >>>>Requested Data Value | M | | | | |
| Criticality Diagnostics | O | | | YES | ignore |

The Information Exchange Initiation Response message includes in its 'Requested Data Value' IE the entire mapping information of the cell information per inter-frequency cell ID associated with the cell, requested in step 1045. Table 10 below shows, by way of example, an exemplary format of the 'Requested Data Value' IE according to an embodiment of the present invention, and it includes an 'Inter-frequency Cell Information' IE.

TABLE 10

| IE/Group Name | Presence | Range | Semantics Description | Criticality | Assigned Criticality |
|---|---|---|---|---|---|
| UTRAN Access Point Position with Altitude | O | | | | |
| IPDL Parameters | O | | | | |
| DGPS Corrections | O | | | | |
| GPS Navigation Model and Time Recovery | O | | | | |
| GPS Ionospheric Model | O | | | | |
| GPS UTC Model | O | | | | |
| GPS Almanac | O | | | | |
| GPS Real-Time Integrity | O | | | | |
| GPS RX Pos | O | | | | |
| SFN-SFN Measurement Reference Point Position | O | | | | |
| Cell Capacity Class Value | O | | | YES | ignore |
| NACC Related Data | O | | | YES | ignore |
| MBMS Bearer Service Full Address | O | | | YES | ignore |
| Inter-frequency Cell Information | O | | | YES | ignore |

Table 11 below shows, by way of example, a format of the 'Inter-frequency Cell Information' IE.

TABLE 11

| IE/Group Name | Presence | Range | IE Type and Reference | Semantics Description |
|---|---|---|---|---|
| SIB11 | | 0 ... <maxCellSIB11> | | |
| >Inter-frequency cell id | M | | Integer(0 ... 31) | The order of the inter-frequency cell in SIB11. |
| >DL UARFCN | M | | UARFCN | |
| >UL UARFCN | O | | UARFCN | If this IE is not present, the default duplex distance defined for the operating frequency band shall be used [21] |
| >Primary Scrambling Code | M | | | |
| SIB12 | | 0 ... <maxCellSIB12> | | |
| >Inter-frequency cell id | M | | Integer(0 ... 31) | The order of the inter-frequency cell in SIB12. |

TABLE 11-continued

| | | | | |
|---|---|---|---|---|
| >DL UARFCN | M | | UARFCN | |
| >UL UARFCN | O | | UARFCN | If this IE is not present, the default duplex distance defined for the operating frequency band shall be used [21] |
| >Primary Scrambling Code | M | | | |
| | Range bound | Explanation | | |
| | maxCellSIB11 | Maximum number of inter-frequency cells broadcasted in SIB11. | | |
| | maxCellSIB12 | Maximum number of inter-frequency cells broadcasted in SIB12. | | |

The 'Inter-frequency Cell Information' IE includes separate fields for SIB11/12. Each 'inter-frequency cell id' IE indicates a cell index of the inter-frequency cell info list provided for the inter-frequency measurements, and a 'DL UARFCN' IE and a 'UL UARFCN' IE each include UL/DL frequency information for the non-used frequency cell indicated by the inter-frequency cell index. A 'Primary Scrambling Code' IE indicates a scrambling code used in a primary CPICH of the non-used frequency cell indicated by the inter-frequency cell index. The number of the "Inter-frequency Cell Information" IEs ranges from '0' to 'maxCellSIB11' or 'maxCellSIB12'. The 'maxCellSIB11' indicates the maximum number of the non-used frequency cells included in the inter-frequency cell info list provided for the inter-frequency measurements through the SIB11, and the 'maxCellSIB12' indicates the maximum number of the non-used frequency cells included in the inter-frequency cell info list provided for the inter-frequency measurements through the SIB12.

As described above, if the 'Information Report Characteristics' IE of the Information Exchange Initiation Request message is set to "On Modification," the CRNC transmits an Information Report message to the SRNC in step 1060, each time the inter-frequency cell info list associated with the cell is modified in step 1055. The Information Report message comprises the cell information per inter-frequency cell ID updated according to the modified inter-frequency cell info list, i.e., the entire mapping information of the DL UARFCN, UL UARFCN and Primary Scrambling Code.

Figure 11A:
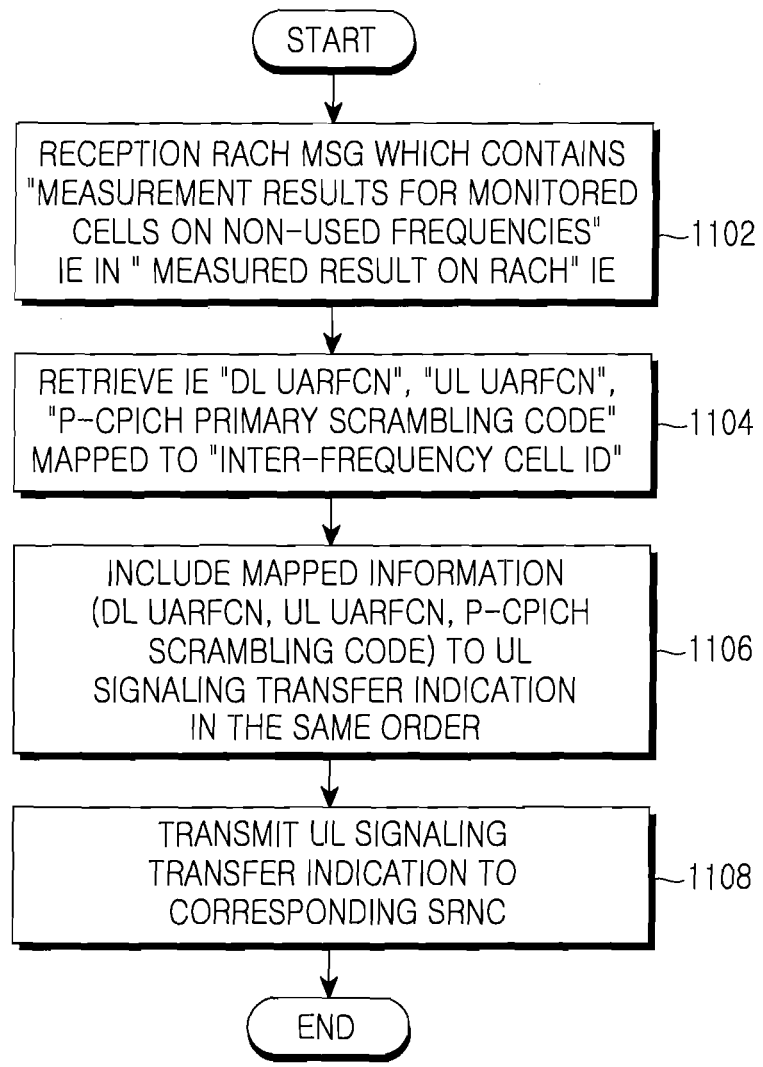
FIGS. 11A and 11B are flowcharts illustrating an exemplary operation of a CRNC according to the fourth embodiment of the present invention.
Figure 11B:
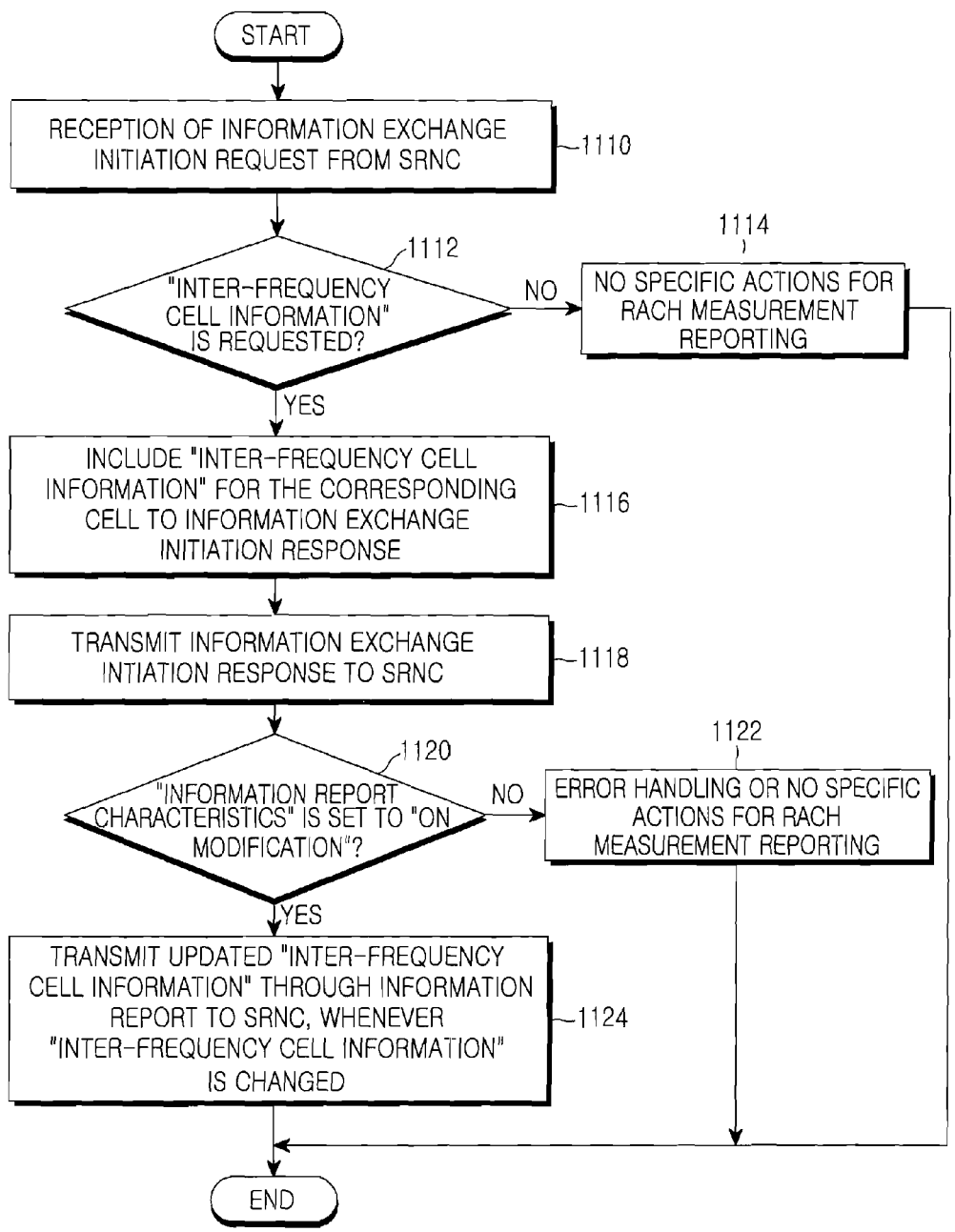

FIGS. 11A and 11B are flowcharts illustrating an exemplary operation of a CRNC according to the fourth embodiment of the present invention.

Referring to FIG. 11A, in step 1102, a CRNC receives a RACH message having a 'Measurement results for monitored cells on non-used frequencies' IE included in a 'Measured Result on RACH' IE from a UE located in a specific cell. In the following description, the specific cell where the UE is located will be referred to as a "current cell". That is, step 1102 indicates reception of a RACH message including measurement results for the non-used frequency cells. As described above, the RACH measurement results comprise inter-frequency cell IDs, i.e., an 'inter-frequency cell id' IEs, of the non-used frequency cells having radio strength exceeding a threshold. In step 1104, the CRNC finds cell information corresponding to the 'inter-frequency cell id' IEs of the RACH message, i.e., finds DL UARFCN, UL UARFCN and Primary Scrambling Code. Because the RACH message includes 'inter-frequency cell indication-SIB11/12' which is an SIB11/12 use indicator indicating an inter-frequency cell IDs of which SIB out of SIB11/12 is used, the CRNC finds cell information corresponding to each of the inter-frequency cell IDs using the SIB11/12 use indicator.

In step 1106, the CRNC includes cell information of the cell corresponding to each of the inter-frequency cell IDs in a UL Signaling Transfer Indication message. If there is a need to transmit cell information for several cells, the CRNC includes the cell information in the order of the inter-frequency cell IDs received through the RACH message. For example, if an 'Inter-frequency cell id' IE is set to '1' and '3' in the RACH message, the CRNC first loads cell information for the cell #'1' and next loads cell information for the cell #'3' in the UL Signaling Transfer Indication message. In step 1108, the CRNC transmits the UL Signaling Transfer Indication message to an SRNC that controls radio resources of the UE.

Referring to FIG. 11B, the CRNC receives an Information Exchange Initiation Request message from the SRNC in step 1110, and checks in step 1112 whether the Information Exchange Initiation Request message needs the entire mapping information of cell information per inter-frequency cell ID of an inter-frequency cell info list of SIB11/12 transmitted from the current cell. As described above, this is possible by checking whether an 'Information Type' IE of the Information Exchange Initiation Request message is set to "Inter-frequency Cell Information". If the 'Information Type' IE is set to the "Inter-frequency Cell Information", the CRNC determines that the entire mapping information of the cell information per inter-frequency cell ID associated with the current cell is needed.

If the result of step 1112 is 'Yes', the CRNC includes the entire mapping information of the cell information per inter-frequency cell ID associated with the current cell in an Information Exchange Initiation Response message responsive to the Information Exchange Initiation Request message in step 1116. As described above, the entire mapping information is loaded on an 'Inter-frequency Cell Information' IE of a 'Requested Data Value' IE included the Information Exchange Initiation Response message. In step 1118, the Information Exchange Initiation Response message is transmitted to the SRNC. However, if the result of step 1112 is 'No', the CRNC performs no specific operation for the RACH measurement reporting in step 1114.

After transmitting the Information Exchange Initiation Response message in step 1118, the CRNC checks in step 1120 whether the 'Information Report Characteristics' IE of the Information Exchange Initiation Request message is set to "On Modification". If the 'Information Report Characteristics' IE is set to "On Modification", the CRNC transmits the entire mapping information of the cell information per inter-frequency cell ID updated by a changed inter-frequency cell info list each time the inter-frequency cell info list of the current cell is changed, to the SRNC through an Information Report message in step 1124. However, if the result of step 1120 is 'No', the CRNC performs a error handling procedure or does not transmit the entire mapping information of the cell information per inter-frequency cell ID updated for the changed list to the SRNC in step 1122, even though the inter-frequency cell info list of the current cell is changed.

Figure 12:
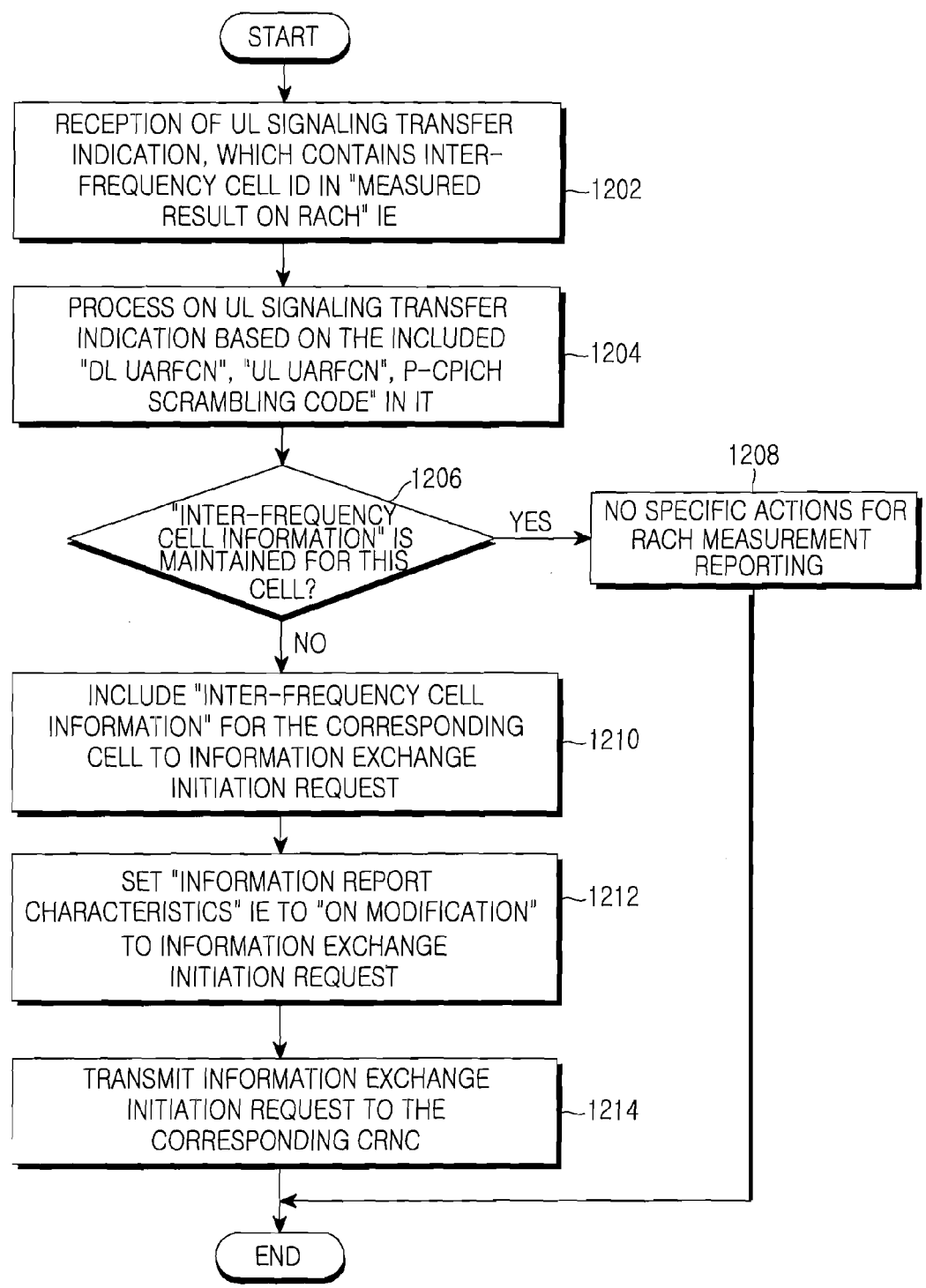
FIG. 12 is a flowchart illustrating an exemplary operation of an SRNC according to the fourth embodiment of the present invention.

FIG. 12 is a flowchart illustrating an exemplary operation of an SRNC according to the fourth embodiment of the present invention.

Referring to FIG. 12, in step 1202, an SRNC receives a message comprising cell information of a specific cell, such as DL UARFCN, UL UARFCN, and Primary Scrambling Code, from a CRNC accessed by a UE that is under its control. In step 1204, the SRNC handles the received message. For example, if the received message is a UL Signaling Transfer Indication message including a Cell Update message, the SRNC handles the Cell Update message and transmits a Cell Update Confirm message to the UE via the CRNC. It will be assumed herein for example, that the received message is the UL Signaling Transfer Indication message.

In step 1206, the SRNC checks whether it already has the entire mapping information of the cell information per inter-frequency cell ID for the current cell (for example, a cell from which the Cell Update message is generated) of the UE that generated the UL Signaling Transfer Indication message. If the result of step 1206 is 'Yes', the SRNC takes no specific action for RACH measurement reporting in step 1208.

However, if the result of step 1206 is 'No', the SRNC sets an 'Information Type' IE of an Information Exchange Initiation Request message to 'Inter-frequency Cell Information' in step 1210, to send a request for the entire mapping information of the cell information per inter-frequency cell ID associated with the current cell to the CRNC. In step 1212, the SRNC sets an 'Information Report Characteristics' IE of the Information Exchange Initiation Request message to "On Modification". In step 1214, the SRNC transmits the Information Exchange Initiation Request message including the 'Information Type' IE and the 'Information Report Characteristics' IE to the CRNC.

Thereafter, upon receiving an Information Exchange Initiation Response message including the entire mapping information of the cell information per inter-frequency cell ID associated with the current cell in response to the Information Exchange Initiation Request message, the SRNC stores the entire mapping information and uses it for reception of the next measurement result reporting. The SRNC updates the entire mapping information every time it receives an Information Report message.

As can be understood from the foregoing description, in performing inter-frequency measurement reporting on the non-used frequency cells in the mobile communication system, the UE restricts unnecessary measurement reporting and minimizes information quality of the RACH message, thereby contributing to a reduction in uplink signaling overhead.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for reporting an inter-frequency measurement result using a random access channel (RACH) message by a User Equipment (UE) in a mobile communication system, the method comprising the steps of:
receiving a system information block (SIB) comprising an inter-frequency cell information list for non-used frequency cells and a threshold from the system, for inter-frequency measurement reporting;
measuring signal strengths of signals received from the non-used frequency cells and comparing the measured signal strengths with the threshold;
if there is any signal strength exceeding the threshold, acquiring one or more inter-frequency cell identifiers (IDs) indicating one or more non-used frequency cells having the signal strength exceeding the threshold referring to the inter-frequency cell information list; and
transmitting the RACH message to the system, the RACH message including the one or more inter-frequency cell IDs as inter-frequency measurement result information,
wherein the inter-frequency measurement result information comprises the one or more inter-frequency cell IDs of non-used frequency cells having the signal strength exceeding the threshold, the one or more inter-frequency cell IDs being ordered according to the signal strength of the non-used frequency cells.

2. The method of claim 1, wherein the inter-frequency cell ID is configured to indicate an order of the non-used frequency cells included in the inter-frequency cell information list.

3. The method of claim 1, wherein the number of the one or more non-used frequency cell IDs included in the inter-frequency measurement result information does not exceed a maximum number indicated by the SIB.

4. The method of claim 1, wherein the RACH message further comprises an indicator for indicating the SIB referred to by the inter-frequency cell ID.

5. The method of claim 1, further comprising the step of transmitting a RACH message without comprising the inter-frequency measurement result information therein, if there is no signal strength exceeding the threshold.

6. A user equipment (UE) apparatus for reporting an inter-frequency measurement result using a random access channel (RACH) message in a mobile communication system, the apparatus comprising:
a receiver for receiving, from a system, system information block (SIB) comprising an inter-frequency cell information list for non-used frequency cells and a threshold from the system, for inter-frequency measurement reporting;
a transmitter for transmitting the RACH message to the system; and
a controller for controlling operations of measuring signal strengths of signals received from the non-used frequency cells and comparing the measured signal strengths with the threshold, if there is any signal strength exceeding the threshold, acquiring one or more inter-frequency cell identifiers (IDs) indicating one or more non-used frequency cells having the signal strength exceeding the threshold referring to the inter-frequency cell information list, and transmitting the RACH message to the system, the RACH message including the one or more inter-frequency cell IDs as inter-frequency measurement result information,
wherein the inter-frequency measurement result information comprises the one or more inter-frequency cell IDs of non-used frequency cells having the signal strength exceeding the threshold, the one or more inter-frequency cell IDs being ordered according to the signal strength of the non-used frequency cells.

7. The UE apparatus of claim 6, wherein the inter-frequency cell ID is configured to indicate an order of the non-used frequency cells included in the inter-frequency cell information list.

8. The UE apparatus of claim 6, wherein the number of the one or more non-used frequency cell IDs included in the inter-frequency measurement result information does not exceed a maximum number indicated by the SIB.

9. The UE apparatus of claim 6, wherein the RACH message further comprises an indicator for indicating the SIB referred to by the inter-frequency cell ID.

10. The UE apparatus of claim 6, wherein the measurement report unit is configured to transmit the RACH message without comprising the inter-frequency measurement result information therein, if there is no signal strength exceeding the threshold.

* * * * *